US010645694B2

(12) United States Patent
Yi et al.

(10) Patent No.: US 10,645,694 B2
(45) Date of Patent: *May 5, 2020

(54) OVER THE AIR SIGNALING OF DYNAMIC FREQUENCY SELECTION (DFS) OPERATING PARAMETERS TO CLIENT DEVICES

(71) Applicant: Network Performance Research Group LLC, Campbell, CA (US)

(72) Inventors: Seung Baek Yi, Norwich, VT (US); Kun Ting Tsai, Fremont, CA (US); Paul V. Yee, Vancouver (CA); Terry F. K. Ngo, Bellevue, WA (US); Erick Kurniawan, San Francisco, CA (US)

(73) Assignee: Network Performance Research Group LLC, Campbell, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 15/647,915

(22) Filed: Jul. 12, 2017

(65) Prior Publication Data
US 2018/0192422 A1 Jul. 5, 2018

Related U.S. Application Data

(63) Continuation of application No. 15/397,206, filed on Jan. 3, 2017, now Pat. No. 9,736,845.

(51) Int. Cl.
*H04W 72/04* (2009.01)
*H04W 16/14* (2009.01)
(Continued)

(52) U.S. Cl.
CPC ......... *H04W 72/0453* (2013.01); *G01S 7/021* (2013.01); *G01S 7/023* (2013.01);
(Continued)

(58) Field of Classification Search
None
See application file for complete search history.

(56) References Cited

U.S. PATENT DOCUMENTS 2,881,421 A * 4/1959 Grosjean ............... G01S 1/02
327/141
3,161,869 A * 12/1964 Chisholm ............. G01S 13/22
342/59

(Continued)

OTHER PUBLICATIONS

Office Action for U.S. Appl. No. 15/397,206 dated Feb. 3, 2017, 283 pages.

*Primary Examiner* — Bernarr E Gregory
(74) *Attorney, Agent, or Firm* — Amin, Turocy & Watson, LLP

(57) ABSTRACT

Over the air signaling of dynamic frequency selection operating parameters to client devices is disclosed. In an embodiment, a multi-channel master device determines a maximum range value of a radar detection umbrella associated with the multi-channel master device based on a first range representing a range at which the multi-channel master device detects a first radar transmission transmitted by a radar device at a defined transmission power; determines a compliance range value based on a second range representing a range at which the multi-channel master device detects a second radar transmission transmitted by the radar device at a dynamic frequency selection (DFS) compliance threshold transmission power; and determines a margin range value based on a third range representing a range at which the multi-channel master device detects a third radar transmission transmitted by the radar device at a transmission power that is lower than the dynamic frequency selection compliance threshold transmission power.

20 Claims, 8 Drawing Sheets

(51) Int. Cl.
*H04W 74/08* (2009.01)
*G01S 7/02* (2006.01)
*G01S 13/00* (2006.01)

(52) U.S. Cl.
CPC .......... *H04W 16/14* (2013.01); *H04W 72/04* (2013.01); *H04W 72/044* (2013.01); *H04W 74/08* (2013.01); *H04W 74/0808* (2013.01)

(56) References Cited

U.S. PATENT DOCUMENTS

| | | | |
|---|---|---|---|
| 3,378,835 A * | 4/1968 | Mooney Jr. | G01S 1/02 342/59 |
| 3,378,840 A * | 4/1968 | Mooney, Jr. | G01S 1/02 342/201 |
| 3,731,310 A * | 5/1973 | Rittenbach | G01S 13/87 342/202 |
| 4,347,513 A * | 8/1982 | Schindler | G01S 7/003 342/13 |
| 5,920,279 A * | 7/1999 | Andersson | G01S 7/282 342/198 |
| 6,064,331 A * | 5/2000 | Avila | G01S 13/22 342/118 |
| 6,870,815 B2 | 3/2005 | McFarland et al. | |
| 6,937,674 B2 * | 8/2005 | Santhoff | H04W 72/08 375/138 |
| 7,155,230 B2 * | 12/2006 | Tsien | G01S 7/021 455/450 |
| 7,496,368 B2 * | 2/2009 | Zimmermann | H04W 16/14 455/455 |
| 7,522,092 B2 * | 4/2009 | Okai | G01S 7/023 342/159 |
| 7,679,562 B2 * | 3/2010 | Shirakawa | G01S 13/003 342/118 |
| 7,813,318 B2 | 10/2010 | Hu | |
| 7,869,400 B2 | 1/2011 | Hu et al. | |
| 7,944,886 B2 | 5/2011 | Stephenson et al. | |
| 8,031,618 B2 | 10/2011 | Hu | |
| 8,081,615 B2 | 12/2011 | Uln et al. | |
| 8,116,688 B2 | 2/2012 | Matsumoto et al. | |
| 8,207,884 B2 * | 6/2012 | Wen | G01S 7/021 342/20 |
| 8,315,570 B2 | 11/2012 | Arbel | |
| 8,400,938 B2 | 3/2013 | Matsura | |
| 8,427,588 B2 | 4/2013 | Kimura | |
| 8,432,826 B2 | 4/2013 | Heidari et al. | |
| 8,503,383 B2 | 8/2013 | Hu et al. | |
| 8,605,708 B2 * | 12/2013 | Nakamura | H04B 7/0617 370/294 |
| 8,711,808 B2 | 4/2014 | Adling et al. | |
| 8,724,476 B2 | 5/2014 | Matsuura | |
| 8,879,996 B2 * | 11/2014 | Kenney | H04W 72/0453 455/62 |
| 9,119,079 B2 | 8/2015 | Soyak et al. | |
| 9,258,760 B2 | 2/2016 | Nagai et al. | |
| 9,377,527 B2 * | 6/2016 | Marr | G01S 7/023 |
| 9,408,087 B2 | 8/2016 | Kurucz, Jr. et al. | |
| 9,439,197 B1 | 9/2016 | Ngo et al. | |
| 9,594,153 B1 * | 3/2017 | Oroskar | G01S 7/021 |
| 9,622,089 B1 * | 4/2017 | Ngo | H04W 16/14 |
| 9,635,669 B2 * | 4/2017 | Gormley | H04W 16/14 |
| 9,730,219 B2 * | 8/2017 | Rambach | H04W 72/0446 |
| 9,736,845 B1 * | 8/2017 | Yi | G01S 7/023 |
| 2003/0107512 A1 * | 6/2003 | McFarland | G01S 7/021 342/159 |
| 2004/0151137 A1 * | 8/2004 | McFarland | H04W 16/14 370/329 |
| 2004/0156336 A1 * | 8/2004 | McFarland | H04W 16/14 370/329 |
| 2010/0225530 A1 | 9/2010 | Lin et al. | |
| 2012/0050089 A1 * | 3/2012 | Gurevich | G01S 7/003 342/59 |
| 2012/0200448 A1 * | 8/2012 | Dowla | G01S 7/006 342/59 |
| 2014/0286249 A1 | 9/2014 | Yamada et al. | |
| 2015/0063147 A1 | 3/2015 | Sadek et al. | |
| 2015/0063321 A1 | 3/2015 | Sadek et al. | |
| 2015/0192665 A1 * | 7/2015 | Lim | G01S 7/023 342/59 |
| 2016/0109568 A1 * | 4/2016 | Aoyagi | G01S 7/03 342/59 |

* cited by examiner

OVER THE AIR SIGNALING OF DYNAMIC FREQUENCY SELECTION (DFS) OPERATING PARAMETERS TO CLIENT DEVICES

CROSS REFERENCE TO RELATED APPLICATIONS

This application claims priority to U.S. patent application Ser. No. 15/397,206, titled: "OVER THE AIR SIGNALING OF DYNAMIC FREQUENCY SELECTION (DFS) OPERATING PARAMETERS TO CLIENT DEVICES," filed Jan. 3, 2017, now U.S. Pat. No. 9,736,845, the disclosure of which is hereby incorporated herein by reference in its entirety.

BACKGROUND

Wi-Fi networks are crucial to today's portable modern life. Wi-Fi is the preferred network in the growing Internet-of-Things (IoT). But, the technology behind current Wi-Fi has changed little in the last ten years. The Wi-Fi network and the associated unlicensed spectrum are currently managed in inefficient ways. For example, there is little or no coordination between individual networks and equipment from different manufacturers. Such networks generally employ primitive control algorithms that assume the network consists of "self-managed islands," a concept originally intended for low density and low traffic environments. The situation is far worse for home networks, which are assembled in completely chaotic ad hoc ways. Further, with more and more connected devices becoming commonplace, the consequence is growing congestion and slow networks with unreliable connections.

Similarly, Long Term Evolution in unlicensed spectrum (LTE-U) networks operating in the same or similar unlicensed bands as IEEE 802.11ac/n Wi-Fi suffer similar congestion and unreliable connection issues and will often create congestion problems for existing Wi-Fi networks sharing the same channels. Additional bandwidth and better and more efficient utilization of spectrum is key to sustaining the usefulness of wireless networks including the Wi-Fi and LTE-U networks in a fast growing connected world.

SUMMARY

The subject application relates to wireless networks and more specifically to systems and methods for the provision of over the air signaling of dynamic frequency selection operating parameters to client devices. In an embodiment, the subject application describes a multi-channel master device comprising at least a processor, coupled to a memory that stores machine or computer executable instructions that when executed perform operations, comprising: as a function of a first range at which the multi-channel master device detects a first radar transmission transmitted by a radar device at a defined transmission power, determining a maximum range value of a radar detection umbrella associated with the multi-channel master device; as a function of a second range at which the multi-channel master device detects a second radar transmission transmitted by the radar device at a dynamic frequency selection (DFS) compliance threshold transmission power, determining a compliance range value; and as a function of a third range at which the multi-channel master device detects a third radar transmission transmitted by the radar device at a transmission power that is lower than the dynamic frequency selection compliance threshold transmission power, determining a margin range value.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel features of the embodiments described will become apparent from the following detailed description of the specification when considered in conjunction with the drawings.

BRIEF DESCRIPTION OF THE DRAWINGS

The aforementioned objects and advantages of the subject application, as well as additional objects and advantages thereof, will be more fully understood herein after as a result of a detailed description of a preferred embodiment when taken in conjunction with the following drawings in which.

DETAILED DESCRIPTION

Figure 1:
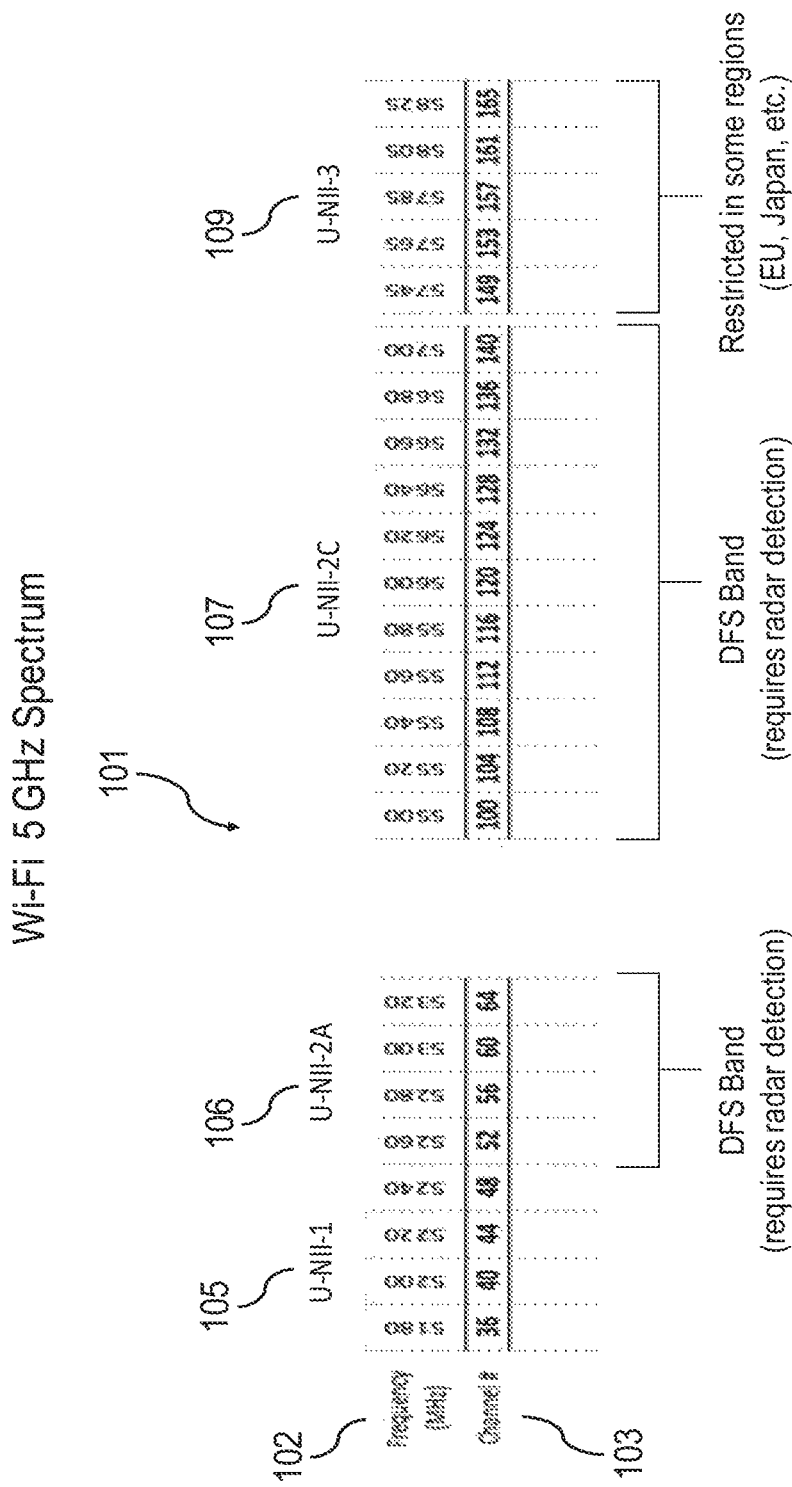
FIG. 1 illustrates portions of the 5 GHz Wi-Fi spectrum including portions that require active monitoring for radar signals.

The subject application relates to wireless networks and more specifically to systems and methods for providing and/or supplying over the air signaling of DFS operating parameters to client devices.

Devices operational in certain parts of the 5 GHz U-II-2 band, known as DFS channels, require active radar detection. This function can be assigned to a device capable of detecting radar, known as a DFS master device, which typically can be an access point device or router device. The DFS master device actively scans the DFS channels and performs a channel availability check (CAC) and periodic in-service monitoring (ISM) after the channel availability check. The channel availability check typically lasts 60 seconds as required by the FCC Part 15 Subpart E and ETSI 301 893 standards. The DFS master device signals to the other devices in the network (typically client devices) by transmitting a DFS beacon indicating that the channel is clear of radar. Although access point devices can detect radar, wireless client devices typically cannot. Because of this, wireless client devices must first passively scan DFS channels to detect whether a beacon is present on that particular channel. During a passive scan, the client device switches through channels and listens for a beacon transmitting at regular intervals by the access point device on an available channel.

Once a beacon is detected, the client device is allowed to actively scan on that channel. If the DFS master device detects radar in the channel, the DFS master device no longer transmits the beacon, and all client devices upon not sensing the beacon within a prescribed time period must vacate the channel immediately and generally remain off that channel for 30 minutes. For clients associated with the DFS master device network, additional information in the beacon (e.g., the channel switch announcement) can trigger a rapid and controlled evacuation of the channel.

In accordance with an embodiment, a multi-channel master device is disclosed. The multi-channel master device can comprise a processor, coupled to a memory that stores machine or computer executable instructions that when executed perform operations, comprising: as a function of a first range at which the multi-channel master device detects a first radar transmission transmitted by a radar device at a defined transmission power, determining a maximum range value of a radar detection umbrella associated with the multi-channel master device; as a function of a second range at which the multi-channel master device detects a second radar transmission transmitted by the radar device at a dynamic frequency selection (DFS) compliance threshold transmission power, determining a compliance range value; and as a function of a third range at which the multi-channel master device detects a third radar transmission transmitted by the radar device at a transmission power that is lower than the dynamic frequency selection compliance threshold transmission power, determining a margin range value.

Further operations can comprise determining the maximum range value, the compliance range value, or the margin range value as a function of two or more radar received power measurement values transmitted at different ranges from the radar device; determining the maximum range value, the compliance range value, or the margin range value as a function of two or more radar received power measurement values transmitted from different ranges from the radar device and another radar device; determining the maximum range value, the compliance range value, or the margin range value as a function of two or more radar received power measurement values representing one or more ranges associated with the radar device or another radar device; and determining an actual range value of the radar detection umbrella as a function of a reduction of the maximum range value by a defined margin.

In regard to determining the foregoing power measurement values, without limitation or loss of generality it should be noted that in instances where the multi-channel master device has no prior history in regard to detection of radar signals broadcast or emitted by proximate radar emitting devices, in accordance with an aspect, default radar signal measurement approximations can be employed, wherein the default radar signal measurement approximations can be based on geographic information representing geo-location codes indicative of a location within which the multi-channel master device has been situated or located and/or nominal radar parameters that can be typical or obtained from a database device of a network of database devices.

In accordance with a further embodiment, a method is disclosed wherein the method comprises determining a maximum range value of a radar detection umbrella associated with a multi-channel master device based on a first range representing a range at which the multi-channel master device detects a first radar transmission transmitted by a radar device at a defined transmission power; determining a compliance range value based on a second range representing a range at which the multi-channel master device detects a second radar transmission transmitted by the radar device at a dynamic frequency selection (DFS) compliance threshold transmission power; and determining a margin range value based on a third range representing a range at which the multi-channel master device detects a third radar transmission transmitted by the radar device at a transmission power that is lower than the dynamic frequency selection compliance threshold transmission power.

In accordance with yet an additional embodiment, a machine-readable storage medium is described. The machine-readable storage medium can comprise executable instructions that, when executed by a processor, facilitate performance of operations. The operations comprise determining a maximum range value of a radar detection umbrella associated with a multi-channel master device based on a first range representing a range at which the multi-channel master device detects a first radar transmission transmitted by a radar device at a defined transmission power; determining a compliance range value based on a second range representing a range at which the multi-channel master device detects a second radar transmission transmitted by the radar device at a dynamic frequency selection (DFS) compliance threshold transmission power; and determining a margin range value based on a third range representing a range at which the multi-channel master device detects a third radar transmission transmitted by the radar device at a transmission power that is lower than the dynamic frequency selection compliance threshold transmission power.

FIG. 1 illustrates portions of a 5 GHz Wi-Fi spectrum 101. FIG. 1 shows frequencies 102 and channels 103 that make up portions of the 5 GHz Wi-Fi spectrum 101. The channels 103 of the GHz Wi-Fi spectrum 101 may be a plurality of 5 GHz communication channels (e.g., a plurality of 5 GHz radio channels). A U-NII band is a Federal Communications Commission (FCC) regulatory domain for 5-GHz wireless devices and is part of the radio frequency spectrum used by IEEE 802.11ac/n devices and by many wireless internet service providers. The U-NII band operates over four ranges. For example, a U-NII-1 band 105 covers the 5.15-5.25 GHz range of the 5 GHz Wi-Fi spectrum 101, a U-NII-2A band 106 covers the 5.25-5.35 GHz range of the 5 GHz Wi-Fi spectrum 101, a U-NII-2C band 107 covers the 5.47-5.725 GHz range of the 5 GHz Wi-Fi spectrum 101, and a U-NII-3 band 109 covers the 5.725-5.850 GHz range of the 5 GHz Wi-Fi spectrum 101. The U-NII-2A band 106 is subject to DFS radar detection and avoidance requirements. The U-NII-2C band 107 is also subject to DFS radar detection and avoidance requirements. Use of the U-NII-3 band 109 is restricted in some jurisdictions like the European Union and Japan.

When used in an 802.11ac/n or LTE-U wireless network, an agility agent of the subject application functions as an autonomous DFS master device. In contrast to conventional DFS master devices, the agility agent is not an access point or router, but rather the agility agent is a standalone wireless device employing inventive scanning techniques described herein that provide DFS scan capabilities across multiple channels, enabling one or more access point devices and peer-to-peer client devices to exploit simultaneous multiple DFS channels. The standalone autonomous DFS master of the subject application may be incorporated into another device such as an access point, LTE-U host, base station, cell, or small cell, media or content streamer, speaker, television, mobile phone, mobile router, software access point device, or peer to peer device but does not itself provide network access to client devices. In particular, in the event of a radar event or a false-detect, the enabled access point and clients or wireless device are able to move automatically, predictively and very quickly to another DFS channel.

Figure 2:
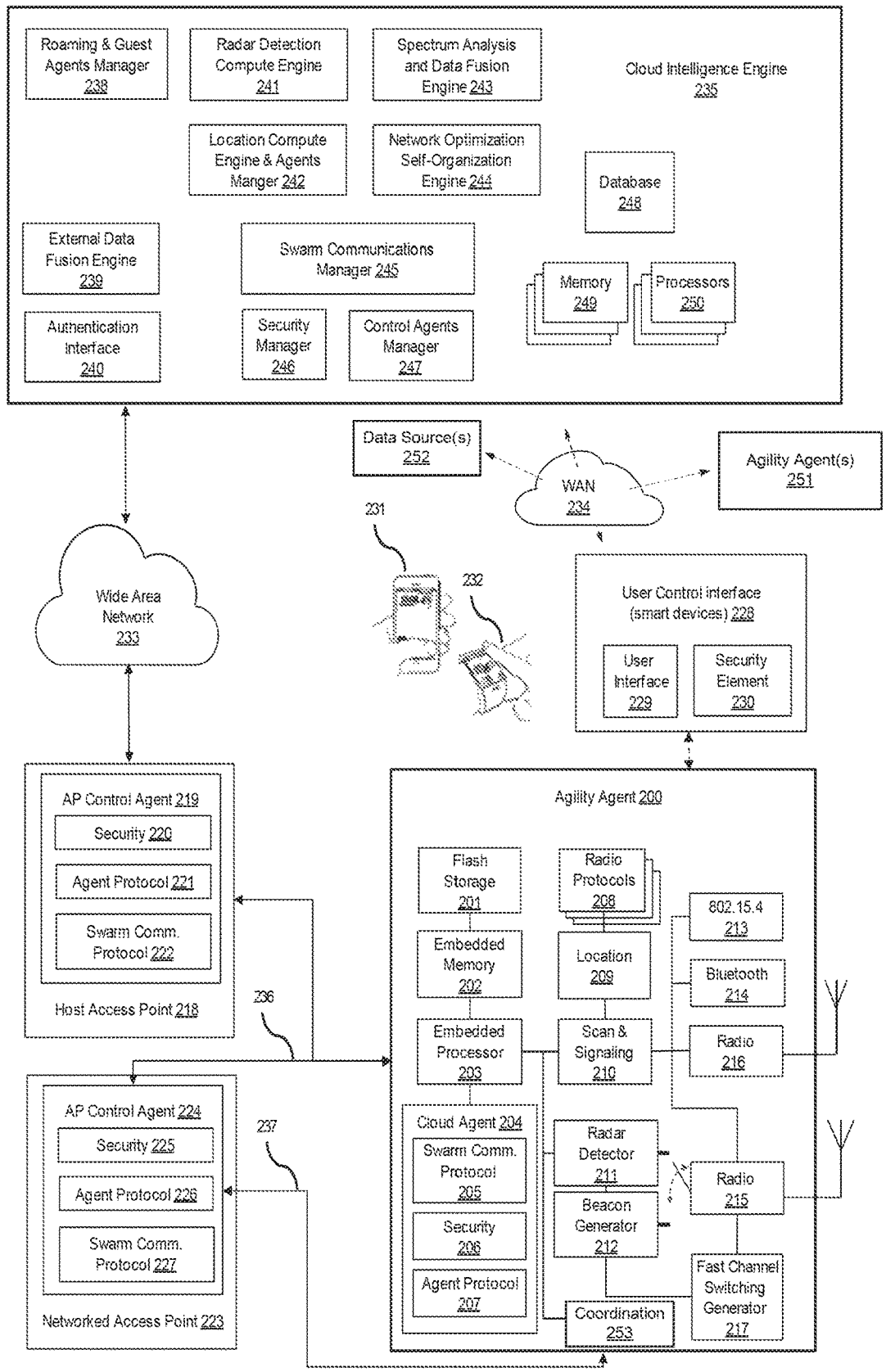
FIG. 2 illustrates how such an autonomous DFS master may interface with a conventional host access point, a cloud-based intelligence engine, and client devices in accordance with the subject application.

FIG. 2 provides a detailed illustration of an exemplary system of the subject application. As illustrated in FIG. 2, an agility agent 200, in the role of an autonomous DFS master device, may control at least one access point or LTE-U small cell base station to dictate selection of a channel (e.g., a communication channel associated with the 5 GHz Wi-Fi spectrum 101, a communication channel associated with a 5.9 GHz spectrum, a communication channel associated with a 3.5 GHz spectrum, etc.) for the at least one access point. For example, the agility agent 200 may control a host access point 218 to dictate selection of a channel (e.g., a communication channel associated with the 5 GHz Wi-Fi spectrum 101, a communication channel associated with a 5.9 GHz spectrum, a communication channel associated with a 3.5 GHz spectrum, etc.) for the host access point 218. In one example, the agility agent 200 may be an agility agent device. In another example, the agility agent 200 may be a DFS device (e.g., an autonomous DFS master device, a standalone multi-channel DFS master, etc.). The agility agent 200 may dictate selection of a channel for the at least one access point or the LTE-U small cell base station (e.g., the host access point 218) based on information provided to and/or received from a cloud intelligence engine 235. For example, the agility agent 200 may be an agility agent device in communication with the host access point device 218. Furthermore, the agility agent 200 may generate spectral information associated with a plurality of 5 GHz communication channels (e.g., a plurality of 5 GHz communication channels associated with the 5 GHz Wi-Fi spectrum 101) for the host access point device 218. However, it is to be appreciated that the agility agent may alternatively generate spectral information associated with a different plurality of communication channels (e.g., a plurality of 5.9 GHz communication channels, a plurality of 3.5 GHz communication channels, etc.). The cloud intelligence engine 235 may be a device (e.g. a cloud intelligence device) that receives the spectral information via a wide area network 233 (e.g. via a network device associated with the wide area network 233). Furthermore, the cloud intelligence engine 235 may integrate the spectral information with other spectral information associated with other host access point devices (e.g., other access point devices 223) to generate integrated spectral information. Then, the cloud intelligence engine 235 may determine a communication channel (e.g., a communication channel from the plurality of 5 GHz communication channels associated with the 5 GHz Wi-Fi spectrum 101) for the host access point device 218 and based at least on the integrated spectral information.

In an aspect, the agility agent 200 may dictate channel selection by (a) signaling availability of one or more DFS channels by simultaneous transmission of one or more beacon signals; (b) transmitting a listing of both the authorized available DFS channels, herein referred to as a whitelist, and the prohibited DFS channels in which a potential radar signal has been detected, herein referred to as a blacklist, along with control signals and a time-stamp signal, herein referred to as a dead-man switch timer via an associated non-DFS channel; (c) transmitting the same signals as (b) over a wired medium such as Ethernet or serial cable; and (d) receiving control, coordination and authorized and preferred channel selection guidance information from the cloud intelligence engine 235. The agility agent 200 sends the time-stamp signal, or dead-man switch timer, with communications to ensure that the access points 218, 223 do not use the information, including the whitelist, beyond the useful lifetime of the information. For example, a whitelist will only be valid for a certain period of time. The time-stamp signal avoids using noncompliant DFS channels by ensuring that an access point will not use the whitelist beyond its useful lifetime. The subject application allows currently available 5 GHz access points without radar detection—which cannot operate in the DFS channels—to operate in the DFS channels by providing the radar detection required by the FCC or other regulatory agencies. In an embodiment, the agility agent 200 may send a status signal (e.g., a heartbeat signal) to the AP control agent 219 to indicate a current status and/or a current state of the agility agent 200. The status signal provided by the agility agent 200 may act as a dead-man switch (e.g., in response to a local failure). Therefore, the AP control agent 219 can safely operate on non-DFS channels. In certain implementations, authorized available DFS channels can be associated with a set of enforcement actions that are time limited (e.g., authorized DFS channels for a certain geographic region can become unavailable for a few hours, etc.).

The host access point 218 and any other access point devices 223 under control of the agility agent 200 typically have an access point control agent portion 219, 224 installed within respective communication stacks. For example, the host access point 218 may have an access point control agent portion 219, 224 installed within a communication stack of the host access point 218. Furthermore, the network access point 223 may also have an access point control agent portion 219, 224 installed within a communication stack of the network access point 223. The access point control agent 219, 224 is an agent that acts under the direction of the agility agent 200 to receive information and commands from the agility agent 200. The access point control agent 219, 224 acts on information from the agility agent 200. For example, the access point control agent 219, 224 listens for information like a whitelist or blacklist from the agility agent. If a radar signal is detected by the agility agent 200, the agility agent 200 communicates that to the access point control agent 219, 224, and the access point control agent 219, 224 acts to evacuate the channel within a certain time interval (e.g., immediately). The control agent can also take commands from the agility agent 200. For example, the host access point 218 and network access point 223 can offload DFS monitoring to the agility agent 200 as long as they can listen to the agility agent 200 and take commands from the agility agent regarding available DFS channels.

The host access point 218 is connected to the wide area network 233 and includes the access point control agent 219 to facilitate communications with the agility agent 200. The access point control agent 219 includes a security module 220 and agent protocols 221 to facilitate communication with the agility agent 200, and swarm communication protocols 222 to facilitate communications between agility agents, access points, client devices and/or other devices in the network. The agility agent 200 connects to the cloud intelligence engine 235 via the host access point 218 and the wide area network 233. The host access point 218 may set up a secure communications tunnel to communicate with the cloud intelligence engine 235 through, for example, an encrypted control channel associated with the host access point 218 and/or an encrypted control API in the host access point 218. The agility agent 200 may transmit (e.g., though the secure communications tunnel) the spectral information to the cloud intelligence engine 235. The spectral information may include information such as, for example, a whitelist (e.g., a whitelist of each of the plurality of 5 GHz communication channels associated with the 5 GHz Wi-Fi spectrum 101 that does not contain a radar signal), a blacklist (e.g., a blacklist of each of the plurality of 5 GHz communication channels associated with the 5 GHz Wi-Fi spectrum 101 that contains a radar signal), scan information associated with a scan for a radar signal in the plurality of 5 GHz communication channels associated with the 5 GHz Wi-Fi spectrum 101, state information, location information associated with the agility agent device and/or the access point device, time signals, scan lists (e.g., scan lists showing neighboring access points, etc.), congestion information (e.g., number of re-try packets, type of re-try packets, etc.), traffic information, other channel condition information, and/or other spectral information. The cloud intelligence engine 235 may combine the spectral information with other spectral information (e.g., other spectral information associated with agility agent(s) 251) to generate combined spectral information. Then, the cloud intelligence engine 235 may determine a particular communication channel (e.g., a particular communication channel associated with the 5 GHz Wi-Fi spectrum 101) and may communicate the particular communication channel to the agility agent 200 (e.g., via the secure communications tunnel). Additionally or alternatively, the cloud intelligence engine 235 may communicate other information to the agility agent 200 (e.g., via the secure communications tunnel) such as, for example, access point location (including neighboring access points), access point/cluster current state and history, statistics (including traffic, congestion, and throughput), whitelists, blacklists, authentication information, associated client information, regional information, regulatory information and/or other information. The agility agent 200 uses the information from the cloud intelligence engine 235 to control the host access point 218, other access points and/or other network devices.

The agility agent 200 may communicate via wired connections or wirelessly with the other network components. In the illustrated example, the agility agent 200 includes a primary radio 215 and a secondary radio 216. The primary radio 215 is for DFS and radar detection. The primary radio 215 is typically a 5 GHz radio. In one example, the primary radio 215 can be a 5 GHz transceiver. The agility agent 200 may receive radar signals, traffic information, and/or congestion information through the primary radio 215. And the agility agent 200 may transmit information, such as DFS beacons, via the primary radio 215. The secondary radio 216 is a secondary radio for sending control signals to other devices in the network. The secondary radio 216 is typically a 2.4 GHz radio. The agility agent 200 may receive information such as network traffic, congestion, and/or control signals with the secondary radio 216. And the agility agent 200 may transmit information, such as control signals, with the secondary radio 216. The primary radio 215 is connected to a fast channel switching generator 217 that includes a switch and allows the primary radio 215 to switch rapidly between a radar detector 211 and beacon generator 212. The fast channel switching generator 217 allows the radar detector 211 to switch sufficiently fast to appear to be on multiple channels at a time. In certain implementations, the agility agent 200 may also include coordination 253. The coordination 253 may provide cross-network coordination between the agility agent 200 and another agility agent (e.g., agility agent(s) 251). For example, the coordination 253 may provide coordination information (e.g., precision location, precision position, channel allocation, a time-slice duty cycle request, traffic loading, etc.) between the agility agent 200 and another agility agent (e.g., agility agent(s) 251) on a different network. In one example, the coordination 253 may enable an agility agent (e.g., agility agent 200) attached to a WiFi router to coordinate with a nearby agility (e.g., agility agent(s) 251) attached to a LTE-U small cell base station.

In one embodiment, a standalone multi-channel DFS master (e.g., the agility agent 200) includes a beacon generator 212 to generate a beacon in each of a plurality of 5 GHz radio channels (e.g., a plurality of 5 GHz radio channels associated with the 5 GHz Wi-Fi spectrum 101), a radar detector 211 to scan for a radar signal in each of the plurality of 5 GHz radio channels, a 5 GHz radio transceiver (e.g., the primary radio 215) to transmit the beacon in each of the plurality of 5 GHz radio channels and to receive the radar signal in each of the plurality of 5 GHz radio channels, and a fast channel switching generator 217 coupled to the radar detector, the beacon generator, and the 5 GHz radio transceiver. The fast channel switching generator 217 switches the 5 GHz radio to a first channel of the plurality of 5 GHz radio channels and then causes the beacon generator 212 to generate the beacon in the first channel of the plurality of 5 GHz radio channels. Then, the fast channel switching generator 217 causes the radar detector 211 to scan for the radar signal in the first channel of the plurality of 5 GHz radio channels. The fast channel switching generator 217 then repeats these steps for each other channel of the plurality of 5 GHz radio channels during a beacon transmission duty cycle and, in some examples, during a radar detection duty cycle. The beacon transmission duty cycle is the time between successive beacon transmissions on a given channel and the radar detection duty cycle which is the time between successive scans on a given channel. Because the agility agent 200 cycles between beaconing and scanning in each of the plurality of 5 GHz radio channels in the time window between a first beaconing and scanning in a given channel and a subsequent beaconing and scanning the same channel, it can provide effectively simultaneous beaconing and scanning for multiple channels.

The agility agent 200 also may contain a BLUETOOTH® radio 214 and/or an 802.15.4 radio 213 for communicating with other devices in the network. The agility agent 200 may include various radio protocols 208 to facilitate communication via the included radio devices.

The agility agent 200 may also include a location module 209 to geolocate or otherwise determine the location of the agility agent 200. Information provided by the location module 209 may be employed to location-tag and/or time-stamp spectral information collected and/or generated by the agility agent 200. As shown in FIG. 2, the agility agent 200 may include a scan and signaling module 210. The agility agent 200 includes embedded memory 202, including for example flash storage 201, and an embedded processor 203. The cloud agent 204 in the agility agent 200 facilitates aggregation of information from the cloud agent 204 through the cloud and includes swarm communication protocols 205 to facilitate communications between agility agents, access points, client devices, and other devices in the network. The cloud agent 204 also includes a security module 206 to protect and secure the cloud communications of the agility agent 200, as well as agent protocols 207 to facilitate communication with the access point control agents 219, 224.

As shown in FIG. 2, the agility agent 200 may control other access points, for example networked access point 223, in addition to the host access point 218. The agility agent 200 may communicate with the other access points 223 via a wired or wireless connection 236, 237. In one example, the agility agent 200 may communicate with the other access points 223 via a local area network. The other access points 223 include an access point control agent 224 to facilitate communication with the agility agent 200 and other access points. The access point control agent 224 includes a security module 225, agent protocols 226 and swarm communication protocols 227 to facilitate communications with other agents (including other access points and client devices) on the network.

The cloud intelligence engine 235 includes a database 248 and memory 249 for storing information from the agility agent 200, one or more other agility agents (e.g., the agility agent(s) 251) connected to the cloud intelligence engine 235 and/or one or more external data source (e.g., data source(s) 252). The database 248 and memory 249 allow the cloud intelligence engine 235 to store information associated with the agility agent 200, the agility agent(s) 251 and/or the data source(s) 252 over a certain period of time (e.g., days, weeks, months, years, etc.). The data source(s) 252 may be associated with a set of databases. Furthermore, the data source(s) 252 may include regulation information (e.g., non-spectral information) such as, but not limited to, geographical information system (GIS) information, other geographical information, FCC information regarding the location of radar transmitters, FCC blacklist information, National Oceanic and Atmospheric Administration (NOAA) databases, Department of Defense (DOD) information regarding radar transmitters, DOD requests to avoid transmission in DFS channels for a given location, and/or other regulatory information.

The cloud intelligence engine 235 also includes processors 250 to perform the cloud intelligence operations described herein. In an aspect, the processors 250 may be communicatively coupled to the memory 249. Coupling can include various communications including, but not limited to, direct communications, indirect communications, wired communications, and/or wireless communications. In certain implementations, the processors 250 may be operable to execute or facilitate execution of one or more of computer-executable components stored in the memory 249. For example, the processors 250 may be directly involved in the execution of the computer-executable component(s), according to an aspect. Additionally or alternatively, the processors 250 may be indirectly involved in the execution of the computer executable component(s). For example, the processors 250 may direct one or more components to perform the operations.

The roaming and guest agents manager 238 in the cloud intelligence engine 235 provides optimized connection information for devices connected to agility agents that are roaming from one access point to another access point (or from one access point to another network). The roaming and guest agents manager 238 also manages guest connections to networks for agility agents connected to the cloud intelligence engine 235. The external data fusion engine 239 provides for integration and fusion of information from agility agents with information from the data source(s) 252. For example, the external data fusion engine 239 may integrate and/or fuse information such as, but not limited to, GIS information, other geographical information, FCC information regarding the location of radar transmitters, FCC blacklist information, NOAA databases, DOD information regarding radar transmitters, DOD requests to avoid transmission in DFS channels for a given location, and/or other information. The cloud intelligence engine 235 further includes an authentication interface 240 for authentication of received communications and for authenticating devices and users. The radar detection compute engine 241 aggregates radar information from the agility agent 200, the agility agent(s) 251 and/or the data source(s) 252. The radar detection compute engine 241 also computes the location of radar transmitters from those data to, among other things, facilitate identification of false positive radar detections or hidden nodes and hidden radar. The radar detection compute engine 241 may also guide or steer multiple agility agents to dynamically adapt detection parameters and/or methods to further improve detection sensitivity. The location compute and agents manager 242 determines the location of the agility agent 200 and other connected devices (e.g., agility agent(s) 251) through Wi-Fi lookup in a Wi-Fi location database, querying passing devices, triangulation based on received signal strength indication (RSSI), triangulation based on packet time-of-flight, scan lists from agility agents, or geometric inference.

The spectrum analysis and data fusion engine 243 and the network optimization self-organization engine 244 facilitate dynamic spectrum optimization with information from the agility agent 200, the agility agent(s) 251 and/or the data source(s) 252. Each of the agility agents (e.g., the agility agent 200 and/or the agility agent(s) 251) connected to the cloud intelligence engine 235 have scanned and analyzed the local spectrum and communicated that information to the cloud intelligence engine 235. The cloud intelligence engine 235 also knows the location of each agility agent (e.g., the agility agent 200 and/or the agility agent(s) 251) and the access points proximate to the agility agents that do not have a controlling agent as well as the channel on which each of those devices is operating. With this information, the spectrum analysis and data fusion engine 243 and the network optimization self-organization engine 244 can optimize the local spectrum by telling agility agents (e.g., the agility agent 200 and/or the agility agent(s) 251) to avoid channels subject to interference. The swarm communications manager 245 manages communications between agility agents, access points, client devices, and other devices in the network. The cloud intelligence engine includes a security manager 246. The control agents manager 247 manages all connected control agents. In an implementation, the cloud intelligence engine 235 may enable the host access point 218 to coordinate network configurations with same networks (e.g., WiFi to WiFi) and/or across different networks (e.g., WiFi to LTE-U). Furthermore, the cloud intelligence engine 235 may enable agility agents (e.g., agility agent 200 and agility agent(s) 251) connected to different host access devices to communicate within a same network (e.g., WiFi to WiFi) and/or across a different network (e.g., WiFi to LTE-U).

Independent of a host access point 218, the agility agent 200, in the role of an autonomous DFS master device, may also provide the channel indication and channel selection control to one or more peer-to-peer client devices 231, 232 within the coverage area by (a) signaling availability of one or more DFS channels by simultaneous transmission of one or more beacon signals; (b) transmitting a listing of both the authorized available DFS channels, herein referred to as a whitelist and the prohibited DFS channels in which a potential radar signal has been detected, herein referred to as a blacklist along with control signals and a time-stamp signal, herein referred to as a dead-man switch timer via an associated non-DFS channel; and (c) receiving control, coordination and authorized and preferred channel selection guidance information from the cloud intelligence engine 235. The agility agent 200 sends the time-stamp signal, or dead-man switch timer, with communications to ensure that the devices do not use the information, including the whitelist, beyond the useful lifetime of the information. For example, a whitelist will only be valid for certain period of time. The time-stamp signal avoids using noncompliant DFS channels by ensuring that a device will not use the whitelist beyond its useful lifetime.

Such peer-to-peer devices may have a user control interface 228. The user control interface 228 includes a user interface 229 to allow the client devices 231, 232 to interact with the agility agent 200 via the cloud intelligence engine 235. For example, the user interface 229 allows the user to modify network settings via the agility agent 200 including granting and revoking network access. The user control interface 228 also includes a security element 230 to ensure that communications between the client devices 231, 232 and the agility agent 200 are secure. The client devices 231, 232 are connected to a wide area network 234 via a cellular network for example. In certain implementations, peer-to-peer wireless networks are used for direct communication between devices without an access point. For example, video cameras may connect directly to a computer to download video or images files using a peer-to-peer network. Also, device connections to external monitors and device connections to drones currently use peer-to-peer networks. Therefore, in a peer-to-peer network without an access point, DFS channels cannot be employed since there is no access point to control DFS channel selection and/or to tell devices which DFS channels to use. The subject application overcomes this limitation.

Figure 3:
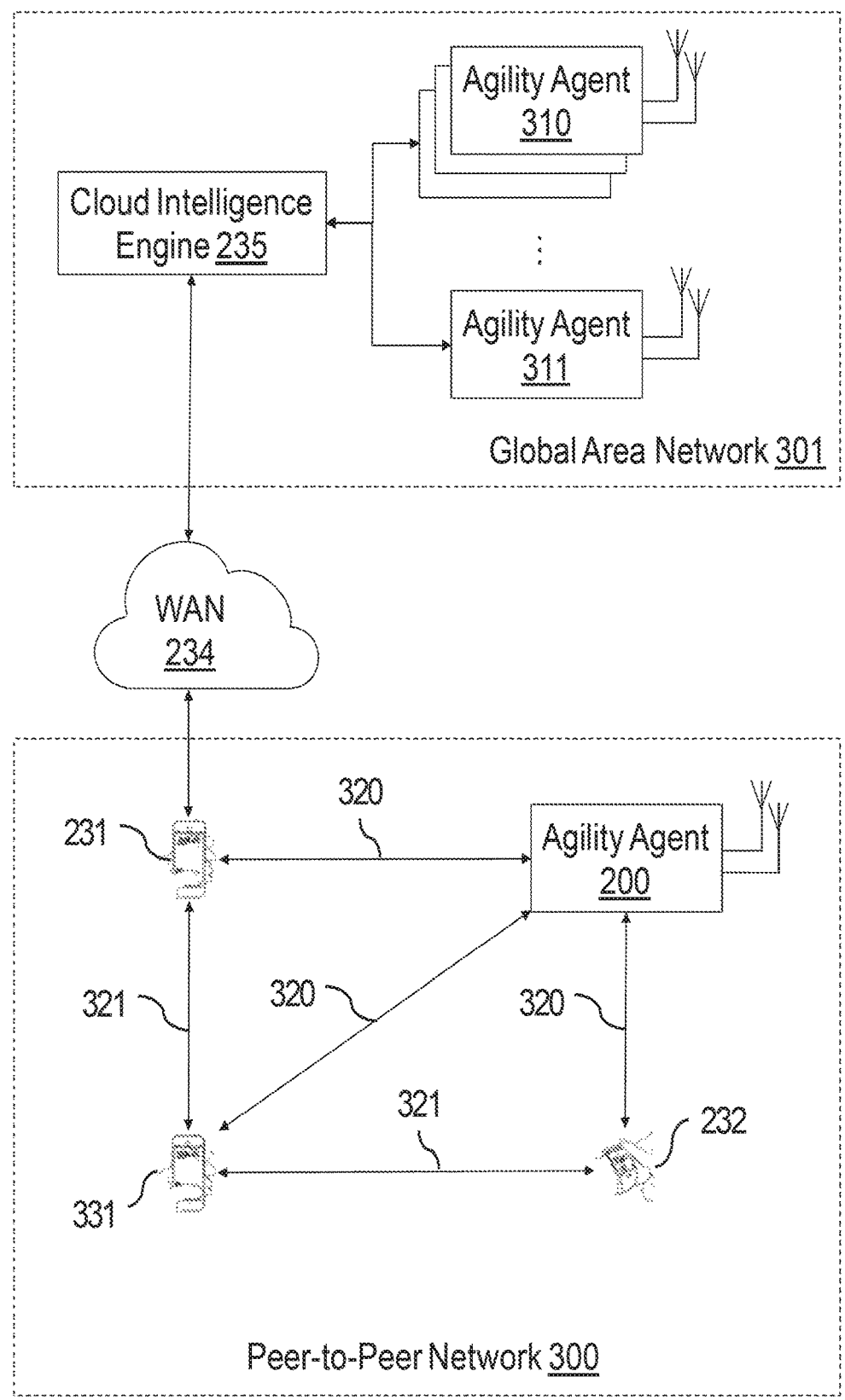
FIG. 3 illustrates how an autonomous DFS master in a peer-to-peer network may interface with client devices and the cloud intelligence engine independent of any access point, in accordance with the subject application.

FIG. 3 illustrates how the agility agent 200 acting as an autonomous DFS master in a peer-to-peer network 300 (a local area network for example) would interface to client devices 231, 232, 331 and the cloud intelligence engine 235 independent of any access point, in accordance with the subject application. As shown in FIG. 3, the cloud intelligence engine 235 may be connected to a plurality of network-connected agility agents 200, 310. The agility agent 200 in the peer-to-peer network 300 may connect to the cloud intelligence engine 235 through one of the network-connected client devices 231, 331 by, for example, piggy-backing a message to the cloud intelligence engine 235 on a message send to the client devices 231, 331 or otherwise co-opting a connection of the client devices 231, 331 to the wide area network 234. In the peer-to-peer network 300, the agility agent 200 sends over-the-air control signals 320 to the client devices 231, 232, 331 including indications of channels free of occupying signals such as DFS channels free of radar signals. Alternatively, the agility agent communicates with just one client device 331 (e.g., a single client device 331) which then acts as the group owner to initiate and control the peer-to-peer communications with other client devices 231, 232. The client devices 231, 232, 331 have peer-to-peer links 321 through which they communicate with each other. The agility agent 200 may operate in multiple modes executing a number of DFS scan methods employing different algorithms.

Figure 4:
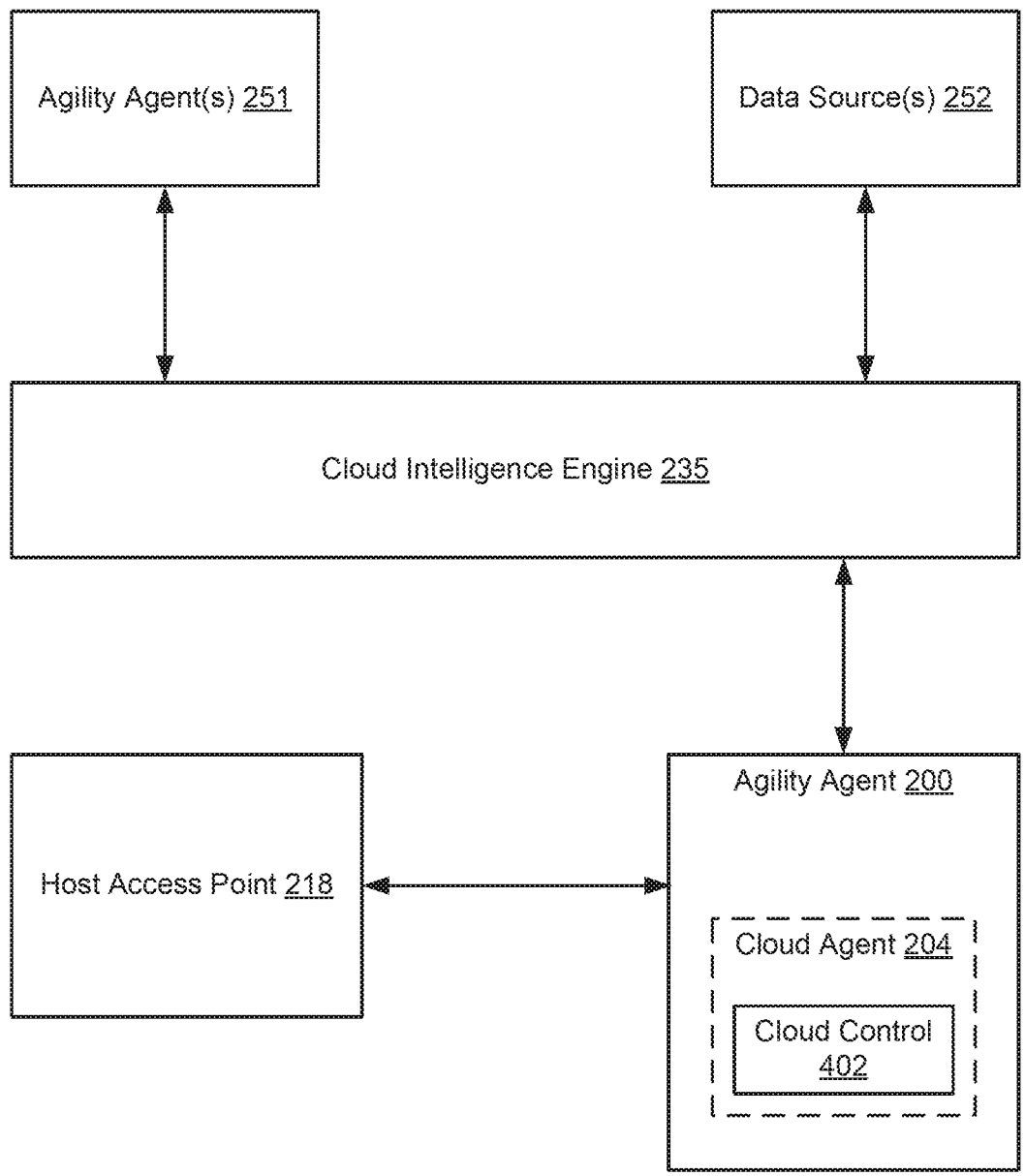
FIG. 4 illustrates a system that includes agility agent(s), a cloud intelligence engine, a host access point and data source(s), in accordance with the subject application.

FIG. 4 illustrates a system that includes the agility agent 200, the cloud intelligence engine 235 and the host access point 218, in accordance with an aspect of the subject application. The agility agent 200 may be directed by the cloud intelligence engine 235 (e.g., a cloud-based data fusion and computation element) to enable adaptive control of dynamic channel selection for the host access point 218 and/or other functions (e.g., dynamic configuration of radio parameters, etc.) associated with the host access point 218. As disclosed herein, in an aspect, the agility agent 200 includes the cloud agent 204. For example, the cloud agent 204 may enable the agility agent 200 to communicate with the host access point 218. The cloud agent 204 may additionally or alternatively communicate with one or more other devices (not shown) such as, for example, a base station (e.g., a small cell base station), a DFS slave device, a peer-to-peer group owner device, a mobile hotspot device, a radio access node device (e.g., an LTE-small cell device), a software access point device and/or another device. In an implementation, the cloud agent 204 includes cloud control 402. The cloud control 402 may further enable the agility agent 200 to communicate with the cloud intelligence engine 235. Furthermore, the cloud control 402 may facilitate dynamic selection of radio channels and/or other radio frequency parameters for the host access point 218. For example, the agility agent 200 may analyze a plurality of 5 GHz radio channels (e.g., a plurality of 5 GHz radio channels associated with the 5 GHz Wi-Fi spectrum 101) for the host access point 218. Additionally or alternatively, the agility agent 200 may analyze a plurality of 5 GHz radio channels (e.g., a plurality of 5 GHz radio channels associated with the 5 GHz Wi-Fi spectrum 101) for the DFS slave device, the peer-to-peer group owner device, the mobile hotspot device, the radio access node device (e.g., the LTE-small cell device), the software access point device and/or another device. In an aspect, the agility agent 200 may actively scan the plurality of 5 GHz radio channels (e.g., the plurality of 5 GHz radio channels associated with the 5 GHz Wi-Fi spectrum 101) during a CAC phase and/or during an ISM phase.

Then, the agility agent 200 may generate spectral information based on the analysis of the plurality of 5 GHz radio channels (e.g., the plurality of 5 GHz radio channels for the host access point 218, the DFS slave device, the peer-to-peer group owner device, the mobile hotspot device, the radio access node device, the software access point device and/or another device). For example, the agility agent 200 may provide information (e.g., spectral information) to the cloud intelligence engine 235 that indicates a set of channels from the plurality of 5 GHz radio channels which are clear of radar and are thus available to use by nearby devices (e.g., the host access point 218). The spectral information may include information such as, for example, a whitelist (e.g., a whitelist of each of the plurality of 5 GHz radio channels that does not contain a radar signal), a blacklist (e.g., a blacklist of each of the plurality of 5 GHz radio channels that contains a radar signal), scan information associated with a scan for a radar signal in the plurality of 5 GHz radio channels, state information, location information associated with the agility agent 200 and/or the host access point 218, time signals, scan lists (e.g., scan lists showing neighboring access points, etc.), congestion information (e.g., number of re-try packets, type of re-try packets, etc.), traffic information, other channel condition information, and/or other spectral information. The cloud control 402 may transmit the spectral information to the cloud intelligence engine 235. In an aspect, the agility agent 200 may transmit the spectral information to the cloud intelligence engine 235 via a wide area network. Additionally or alternatively, the agility agent 200 may transmit the spectral information to the cloud intelligence engine 235 via a set of DFS slave devices in communication with the agility agent 200 (e.g., via a backhaul of DFS slave devices in communication with the agility agent 200). In another aspect, the agility agent 200 may be in communication with the host access point 218 via a local area network (e.g., a wireless local area network). Additionally or alternatively, the agility agent 200 may be in communication with the host access point 218 via a wide area network (e.g., a wireless wide area network), an ad hoc network (e.g., an IBSS network), a peer-to-peer network (e.g., an IBSS peer-to-peer network), a short range wireless network (e.g., a BLUETOOTH® network), another wireless network and/or another wired network.

The cloud intelligence engine 235 may integrate the spectral information with other spectral information (e.g., other spectral information associated with the agility agent(s) 251) to generate integrated spectral information. For example, the cloud intelligence engine 235 may receive the other spectral information from the agility agent(s) 251. The other spectral information may be generated by the agility agents(s) 251 via an analysis of the plurality of 5 GHz radio channels (e.g., an analysis similarly performed by the agility agent 200). In an aspect, the cloud intelligence engine 235 may include a cloud-based data fusion and computation element for intelligent adaptive network organization, optimization, planning, configuration, management and/or coordination based on the spectral information and the other spectral information. The cloud intelligence engine 235 may geo-tag, filter and/or process the integrated spectral information. In an implementation, the cloud intelligence engine 235 may combine the integrated spectral information with regulation information associated with the data source(s) 252. For example, the regulation information associated with the data source(s) 252 may include information such as, but not limited to, GIS information, other geographical information, FCC information regarding the location of radar transmitters, FCC blacklist information, NOAA databases, DOD information regarding radar transmitters, DOD requests to avoid transmission in DFS channels for a given location, and/or other regulatory information. Based on the integrated spectral information and/or the regulation information associated with the data source(s) 252, the cloud intelligence engine 235 may select a radio channel from the plurality of 5 GHz radio channels for the host access point 218 associated with the agility agent 200. Additionally or alternatively, the cloud intelligence engine 235 may select other radio frequency parameters for the host access point 218 based on the integrated spectral information and/or the regulation information associated with the data source(s) 252.

The cloud control 402 may receive control information and/or coordination information (e.g., authorized and/or preferred channel selection guidance) from the cloud intelligence engine 235. For example, the cloud control 402 may receive the radio channel selected by the cloud intelligence engine 235. Additionally or alternatively, the cloud control 402 may receive the other radio frequency parameters selected by the cloud intelligence engine 235. The agility agent 200 (e.g., the cloud agent 204) may communicate the control information and/or the coordination information (e.g., the control information and/or the coordination information received from the cloud intelligence engine 235) to the host access point 218 (and/or any other access points within a certain distance from the agility agent 200), enabling direct control of the host access point 218 by the cloud intelligence engine 235. For example, the agility agent 200 (e.g., the cloud agent 204) may then configure the host access point 218 to receive data via the radio channel selected by the cloud intelligence engine 235 and/or based on the other radio frequency parameters selected by the cloud intelligence engine 235. In an alternate implementation, the control agent 402 may be employed in an access point not directly connected to the agility agent 200, or in a peer-to-peer capable mobile device, to enable faster and/or improved access to DFS channels.

In an aspect, the agility agent 200 may generate the spectral information based on an analysis of the plurality of 5 GHz radio channels associated with the 5 GHz Wi-Fi spectrum 101. For example, the agility agent 200 may switch a 5 GHz transceiver (e.g., the primary radio 215) of the agility agent 200 to a channel of the plurality of 5 GHz radio channels associated with the 5 GHz Wi-Fi spectrum 101, generate a beacon in the channel of the plurality of 5 GHz radio channels associated with the 5 GHz Wi-Fi spectrum 101, and scan for a radar signal in the channel of the plurality of 5 GHz radio channels associated with the 5 GHz Wi-Fi spectrum 101. Additionally, the agility agent 200 may switch a 5 GHz transceiver (e.g., the primary radio 215) of the agility agent 200 to another channel of the plurality of 5 GHz radio channels associated with the 5 GHz Wi-Fi spectrum 101, generate a beacon in the other channel of the plurality of 5 GHz radio channels associated with the 5 GHz Wi-Fi spectrum 101, and scan for a radar signal in the other channel of the plurality of 5 GHz radio channels associated with the 5 GHz Wi-Fi spectrum 101. The agility agent 200 may repeat this process for each channel of the plurality of 5 GHz radio channels associated with the 5 GHz Wi-Fi spectrum 101. The cloud intelligence engine 235 may receive the spectral information via a wide area network. Furthermore, the cloud intelligence engine 235 may integrate the spectral information with other spectral information generated by the agility agents(s) 251 (e.g., to generate integrated spectral information). Then, the cloud intelligence engine 235 may determine a radio channel for the host access point 218 based at least on the integrated spectral information. For example, the cloud intelligence engine 235 may select the radio channel from the plurality of 5 GHz radio channels based at least on the integrated spectral information. In certain implementations, the cloud intelligence engine 235 may receive the regulation information from the data source(s) 252. Therefore, the cloud intelligence engine 235 may determine a radio channel for the host access point 218 based on the integrated spectral information and the regulation information associated with the data source(s) 252.

Devices that use DFS channels are typically required to wait for at least 30 seconds prior to use of those DFS channels, during which time the device is required to monitor the DFS channels, noting channels that are being used by radar emitting devices and channels that are not being used by radar emitting devices. Channels within the 5 GHz transmission spectrum that are not being used by radar transmitting devices can be added to a whitelist, whereas channels within the 5 GHz frequency spectrum that are being used by radar emitting devices can be associated with a blacklist. Because of limitations in radio technology, the constant monitoring of all the DFS channels can be difficult. Thus, a DFS master device can provide this facility—the facility to scan and monitor all channels in the 5 GHz broadcast spectrum in accordance with regulatory requirements.

Typically, a whitelist comprises a list of channels in the 5 GHz broadcast spectrum that are free of broadcast transmissions by radar emitters and these free and clear channels are typically being actively monitored by the DFS master device. The blacklist is generally a list that comprises channels in the 5 GHz broadcast spectrum that, at the time of the monitoring and scanning of the channels by the DFS master device, are being utilized by radar emitting devices, and as such these channels may not be continuously monitored by the DFS master device. Further in regard to the blacklist, once a channel has been included in the blacklist, no attempt should be made by client devices to use these channels. Additionally, once a channel has been placed in the blacklist the channel will remain in the blacklist until the expiration of a non-occupancy period that is generally 60 minutes from when the radar traffic/transmission on the channel was detected. It should be noted, the channels included in the blacklist can also emanate from external databases of databases, rather than from detection by the DFS master device. Generally, the whitelist and the blacklist are generated after a channel availability check (CAC) has been performed. The CAC ensures that checked channels are free and clear of utilization by any radar emitting devices.

If a channel does not appear in a whitelist (e.g. channel has not been channel availability checked) or does not appear in a blacklist, then the channel is not usable at all. The reason for the blacklist is to inform a client device not to bother using channels included in the blacklist. Absence of a channel from either the whitelist or the blacklist does not indicate permissible use of that channel by client devices.

The DFS rules mandate that each and every channel in the 5 GHz broadcast spectrum be monitored to ensure that there is no utilization of channels by radar devices, and once it has been determined that the channel(s) are not occupied with transmissions by radar emitting devices, the free and clear channels still need to be continuously monitored to ensure that a radar emitting device has not started using the channels.

Figure 5:
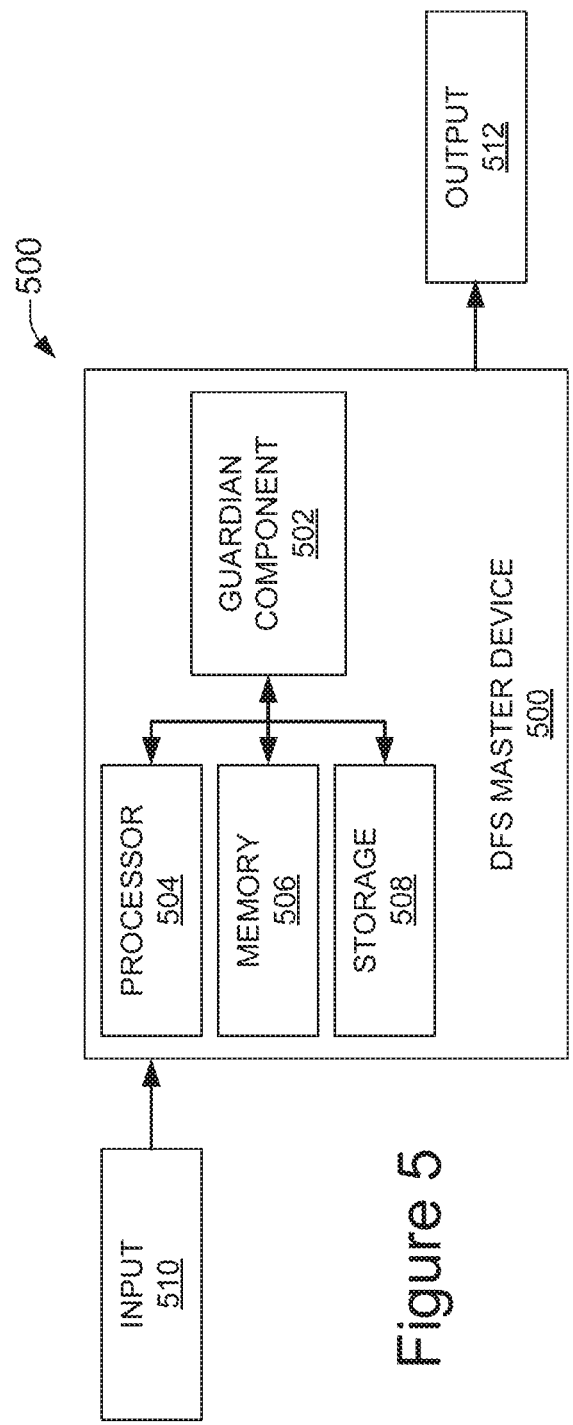
FIG. 5 depicts a system for the provision of over the air signaling of dynamic frequency selection operating parameters to client devices, in accordance with an embodiment.

FIG. 5 depicts a system 500 for the provision of over the air signaling of dynamic frequency selection operating parameters to client devices, in accordance with an embodiment. As illustrated, system 500 can include an autonomous DFS master device 500 that can, for instance, be in the peer-to-peer network 300 and interfacing, for example, with client devices 231, 232, 331, host access point device 218 and/or networked access point device 223, and cloud intelligence engine 235. As illustrated, DFS master device 500 can comprise guardian component 502 that can be coupled to processor 504, memory 506, and storage 508. Guardian component 502 can be in communication with processor 504 for facilitating operation of computer or machine executable instructions and/or components by guardian component 502, memory 506 for storing data and/or the computer or machine executable instructions and/or components, and storage 508 for providing longer term storage of data and/or machine and/or computer readable instructions. Additionally, autonomous DFS master device 500 can also receive input 510 for use, manipulation, and/or transformation by guardian component 502 to produce one or more useful, concrete, and tangible result, and/or transform one or more articles to different states or things. Further, autonomous DFS master device 500 can also generate and output the useful, concrete, and tangible results and/or the transformed one or more articles produced by guardian component 502 as output 512.

For purposes of elucidation, autonomous DFS master device 500 can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise autonomous DFS master device 500 can include tablet computing devices, handheld devices, server class computing machines and/or databases, laptop computers, notebook computers, desktop computers, cell phones, smart phones, consumer appliances and/or instrumentation, industrial devices and/or components, hand-held devices, personal digital assistants, multimedia Internet enabled phones, multimedia players, and the like.

In accordance with an embodiment, autonomous DFS master device 500 can operate in a small coverage area, such as a room, an apartment, or a house. Autonomous DFS master device 500 typically scans channels in the 5 GHz spectrum band to ensure that these channels are free and void of utilization by radar emitting devices. The scanning typically generates/provides a whitelist and a blacklist (the whitelist comprises channels that are free and clear to use; the blacklist comprises channels that, at the time of the scan, are being used for radar transmissions by radar emitting devices). Autonomous DFS master device 500 supplies the whitelist and/or the blacklist to a plurality of client devices (e.g., client devices 231, 232, 331, host access point device 218 and/or networked access point device 223, and cloud intelligence engine 235) over communication bearers, such as wirelessly in a 2.4 GHz transmission spectrum; via wired facilities (e.g., intranets, Internet, . . . ), or BLUETOOTH®, and the like. This permits the plurality of client devices to correspond with the autonomous DFS master device 500 to inquire of the autonomous DFS master device 500 which channels in the 5 GHz transmission band are free and clear for use (i.e., channels that are currently not being used for radar transmission). Any channels in the 5 GHz spectrum that are free and clear for use can be used by client devices for wireless transmissions and/or reception.

In situations where transmissions by radar emitting device are detected (i.e., while client devices are using one or more channels in the 5 GHz frequency spectrum), the autonomous DFS master device 500 can direct notification on a signaling channel (e.g. a channel not in the 5 GHz frequency spectrum, such as any channel in a 2.4 GHz transmission spectrum, BLUETOOTH®, wired facilities, or other wireless functionalities) to the client devices using the one or more channels that a contention has been detected, and that the client devices should implement an appropriate avoidance/evacuation protocol (e.g., stop broadcasting on the 5 GHz channel in which contention has been detected and/or drop out from utilizing the 5 GHz channel entirely).

Autonomous DFS master device 500 can employ both a unicast method of propagating a signal beacon comprising the most current whitelist and/or blacklist, as well as a broadcast method of propagating the signal beacon. In the case of unicast, client devices will typically actively probe the autonomous DFS master device 500 at periodic intervals to request the autonomous DFS master device 500 to supply the whitelists and/or blacklists. In the case of broadcast, autonomous DFS master device 500, at regular defined intervals of time, can broadcast the signal beacon to the clients—the clients passively wait for delivery of the signal beacons. One benefit of employing a unicast method of propagating the signal beacons to client devices is that the whitelists and/or blacklists will be delivered to probing client devices with more reliability. Also, unicast dissemination of whitelists and/or blacklists requires less frequency of updating, the periodicity need not be as regular, and the frequency need not be as great, because there is less likelihood that the beacons will become lost, as in contrast to broadcasting the signal beacon where, because of network interference, the signal beacon can be lost.

Figure 6:
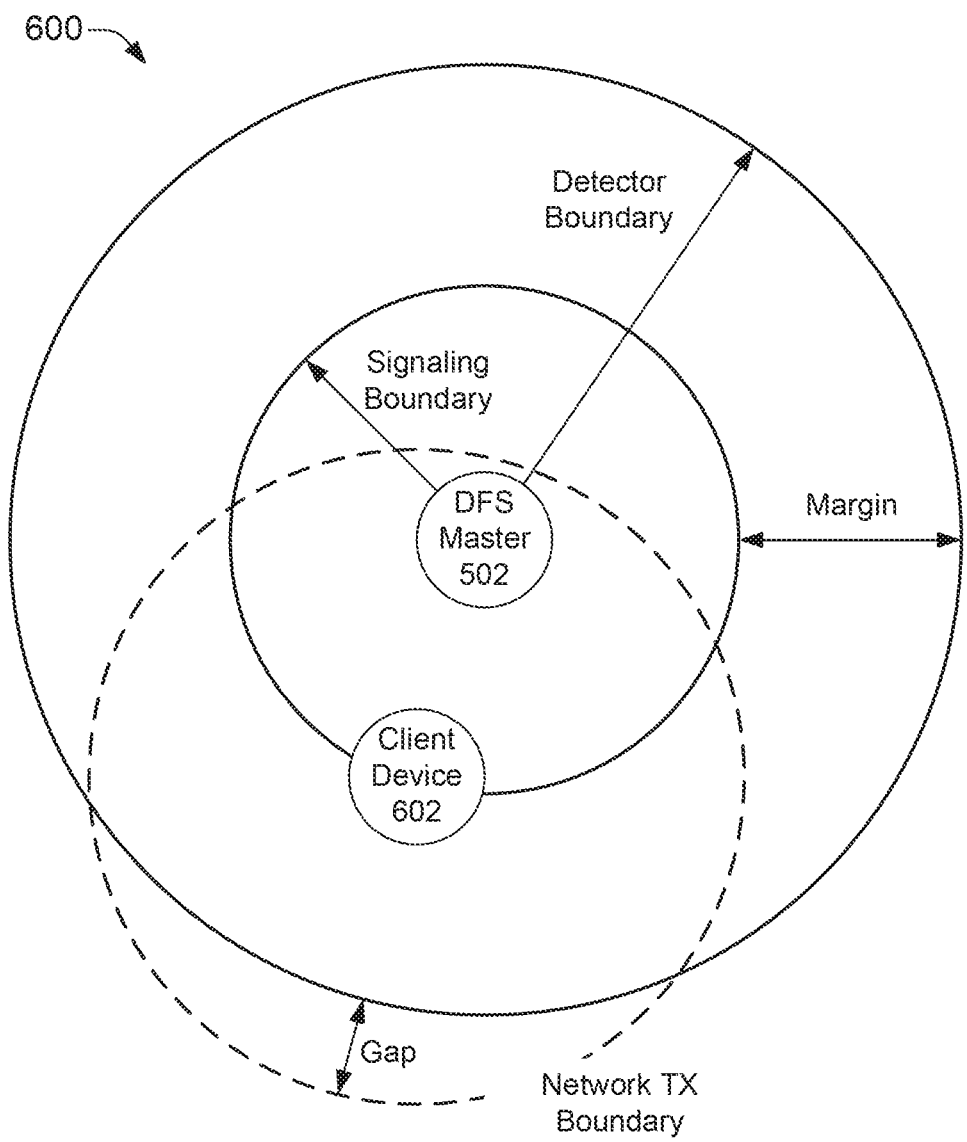
FIG. 6 depicts schematic details for providing over the air signaling of dynamic frequency selection operating parameters to client devices, in accordance with an additional embodiment.

With reference briefly to FIG. 6 and in context of client devices(s) (e.g., client device 602) situated at a signaling boundary of an autonomous DFS master device 500, such a client device's broadcast umbrae, as illustrated as network tx boundary, can extend beyond the detection boundary/coverage afforded by the autonomous DFS master device 500. In this instance, autonomous DFS master device 500 may not have been able to detect the presence of radar transmissions projected into the gap area by a radar emitting device, and as such the autonomous DFS master device 500 can have permitted the client device 602 to continue impermissibly utilizing one or more channels associated with the 5 GHz broadcast spectrum in contravention of the standards.

In order to overcome the foregoing issue, the goal of the subject disclosure is to minimize the gap area, or maximize the detection umbrella provided by the autonomous DFS master device to encompass the transmission/broadcast envelope generated by the client device (e.g., client device 602) situated at the periphery of the autonomous DFS master device's 502 signaling boundary and operating at the limit of the autonomous DFS master device's 502 detection boundary, In the scenario depicted in FIG. 6, the autonomous DFS master device 500, in order to remedy the foregoing situation, can indicate to the client device 602 that it should modify its broadcast parameters (e.g., broadcast transmission power, antenna adjustments, and the like) to desist from broadcasting or transmitting into the gap area. For instance, client device 602 can be notified, by autonomous DFS master device 500, to so severely adjust its broadcast transmission parameters that its only alternatives are to move to a location more proximate to the autonomous DFS master device 500; or the client device 602 can facilitate a request to be moved closer to the autonomous DFS master device 500. Additionally and/or alternatively, autonomous DFS master device 500 can, for instance, notify client device 602 to adjust its antenna tilt settings and/or beam forming settings so that client device 602 is not broadcasting/transmitting into the gap area.

The signaling boundary of autonomous DFS master device 500 typically is an attenuated signal boundary and is generally the umbra of a signal attenuated via reduced transmission power and/or lower signal-to-noise thresholds to limit propagation. The detector boundary of autonomous DFS master device 500 is generally the furthest extent to which the signal can be propagated. The difference between the detector boundary and the signal boundary provides a margin.

Autonomous DFS master device 500, through use of guardian component 502 coupled to processor 504, for example, minimizes the gap between the detection boundary circumscribed around autonomous DFS master device 500 and the network transmission boundary associated with client device 602 positioned at the signaling boundary also circumscribed around the autonomous DFS master device 500. In order to minimize the gap, guardian component 502 can employ the following equations to determine radar power detected at the autonomous DFS master device 500. Radar power can typically be measured and/or determined using the following standard inverse square law radar detector and power function (for ideal isotropic radiation):

$$P_{det} = \frac{P_t \cdot G \cdot G_{det} \cdot c^2}{f_0^2 (4\pi r)^2}$$

where $P_{det}$ is the received radar signal power measured at the autonomous DFS master device 500; $P_t$ is the measured radar transmit power; G is the radar antenna gain; $G_{det}$ is the DFS master device's 502 receive antenna gain; c is the speed of light ($2.99 \times 10^8$ m/s in free space); $f_0$ is the radar signal frequency (e.g., 5 GHz); and r is the distance between the radar device 702 and the autonomous DFS master device 500 (in meters (m)).

The foregoing power function can be equivalently expressed in dBm (decibels (dB)) of measured power referenced to one milliwatt (mW)) (and gains in dB) as:

$$P_{det}(dBm) = P_t(dBm) + G(dB) + P_{det}(db) + 20 \log_{10} \frac{c}{f_0(4\pi r)} = K - 20 \log_{10} r$$

where K is a constant for a given detection scenario. For the purposes of this disclosure, the detection scenario is illustrated in FIG. 7.

Figure 7:
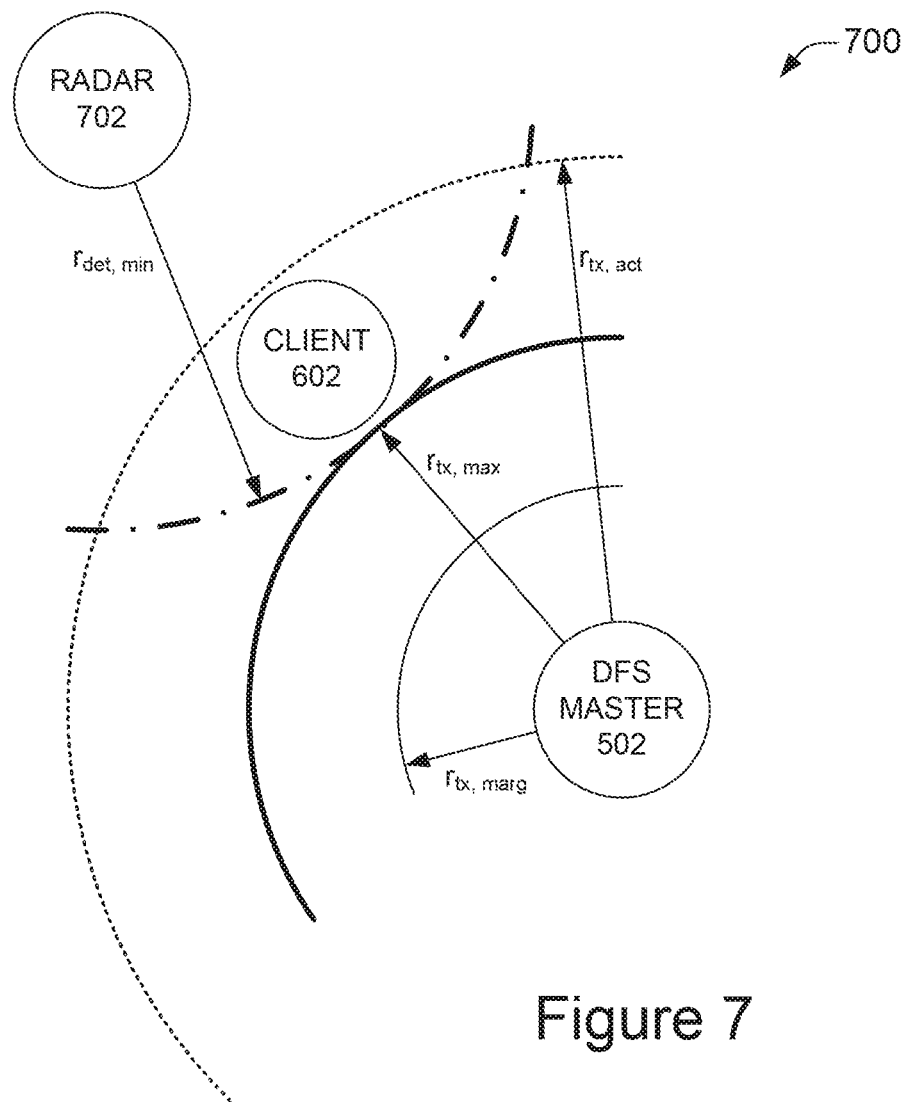
FIG. 7 illustrates further schematic details associated with the provision of over the air signaling of dynamic frequency selection operating parameters to client devices, in accordance with an additional embodiment.

With reference to FIG. 7, illustrated therein is a detection scenario wherein $r_{det,\ min}$ represents the distance from radar device 702 at which the autonomous DFS master device 500 detects the radar transmissions at a DFS compliance detection threshold power level of −62 dBm. It is clear from FIG. 7 that at the limit where the autonomous DFS master device 500 is situated just beyond the distance $r_{det,\ min}$ away from the radar device 702, then no matter how small its actual transmit range $r_{tx,\ act}$, there always exists a nonempty region (the "iris" or "lens" circumscribed by the circular arcs defining $r_{det,\ min}$ and $r_{tx,\ act}$) within which clients (e.g. client device 602) should be instructed by the autonomous DFS master device 500 to avoid DFS operation (due to the detectable presence of radar transmissions from radar device 702) but will not be since the autonomous DFS master device 500 is just beyond the detectable range of the radar. If the range and bearing of each client to the DFS master device 500 is known, then the autonomous DFS master device 500 can instruct only those devices in the "forbidden zone" of the iris to avoid DFS operation while other clients (those not in the "iris" or "lens") can operate compliantly. In practical situations, this complete and precise knowledge of each client's location is not available, hence the autonomous DFS master device 500 must be able to act more conservatively by assuming client devices can be anywhere within a given radius of itself, where the radius is selected to provide a margin of error. Such a mode of operation for the autonomous DFS master device 500 requires that it be able to detect radar transmission by radar device 702 at distances greater than the compliance minimum $r_{det,\ min}$, (i.e., the autonomous DFS master device 500 must be able to detect transmissions by the radar device 702 at a lower threshold than the regulated compliance minimum of −62 dBm). More precisely, the extra detection sensitivity in dB required, $\Delta P_{det,\ min}$, can depend on a fraction $\delta_{det,\ min}$ of extra detection distance desired determined by guardian component 502 via:

$$P_{det,min}(dBm) - \Delta P_{det,min}(dB) = K - 20 \log_{10}(r_{det,min} \cdot (1+\delta_{det,min})) \Rightarrow \Delta P_{det,min}(dB) = 20 \log_{10}(1+\delta_{det,min})$$

which with reference to the scenario illustrated in FIG. 7 provides that the transmit coverage, determined by guardian component 502, of the autonomous DFS master device 500 should be adjusted to not exceed a maximum radius, $r_{tx,\,max}$, determined by guardian component 502 through utilization of the following equation:

$$r_{tx,max} = r_{det,min} \cdot \delta_{det,min}$$

which can be exploited, by autonomous DFS master device 500, in the following ways: (1) the extra radar detection sensitivity $\Delta P_{det,\,min}$ is known a priori, e.g., either by design or characterization, in which case the equation: $\Delta P_{det,min}$ (dB)=20 $\log_{10}(1+\delta_{det,min})$, can be used by guardian component 502 to determine $\delta_{det,\,min}$ and then guardian component 502 can determine $r_{det,\,min}$ from $r_{tx,max} = r_{det,min} \cdot \delta_{det,min}$; (2) the desired DFS master coverage radius $r_{tx,max}$ can be known, in which case guardian component 502 can utilize the equation: $r_{tx,max} = r_{det,min} \cdot \delta_{det,min}$ to determine the fraction $\delta_{det,\,min}$ of extra detection distance which then can be used to determine the extra radar sensitivity $\Delta P_{det,\,min}$, as set forth in the equation:

$$\Delta P_{det,min} \text{ (dB)} = 20 \log_{10}(1+\delta_{det,min}).$$

As a practical measure for both approaches, the desired DFS master coverage radius can be set to some distance $r_{tx,\,marg}$ less than $r_{tx,\,max}$ to allow some margin for measurement/characterization uncertainties and errors.

One concern in regard to the foregoing is accurate knowledge of $r_{det,\,min}$, the distance from the radar device 702 at which the autonomous DFS master device 500 detects the radar transmission by the radar device 702 at the DFS compliance detection threshold. According to the equation:

$$P_{det}(dBm) = P_t(dBm) + G(dB) + P_{det}(db) + 20 \log_{10} \frac{c}{f_0(4\pi r)} = K - 20 \log_{10} r,$$

this distance can be a function of a number of both radar device and autonomous DFS master device 500 detector parameters, the former of which may not be readily available. To alleviate this concern, a possible approach is to perform a pair of differential detector power measurements (with the DFS master detector parameters held constant) where $P_{det,\,min}$ is received and solve for $r_{det,\,min}$ (and K if desired) per the following system of equations:

$$P_{det,min} \text{ (dBm)} = K - 20 \log_{10} r_{det,min}$$

$$P_{det,r} \text{ (dBm)} = K - 20 \log_{10}(r_{det,min}+\Delta r)$$

where $\Delta r$ is the known increment in distance that the autonomous DFS master device 500 was moved to receive DFS detector power $P_{det,\,r}$. It will be appreciated by those of ordinary skill, that this strategy can also be used by the autonomous DFS master device 500 when radar device 702 is detected at a level $P_{det,\,oth}$ other than the DFS compliance detection threshold at a distance $r_{det,\,oth}$ other than $r_{det,\,min}$, in which case K would be isolated and substituted into the system of equations:

$$P_{det,min} \text{ (dBm)} = K - 20 \log_{10} r_{det,min}$$

with $P_{det} = P_{det,\,min}$ to compute $r_{det,\,min}$ (assuming that the DFS master device parameters are the same in both instances).

As a slight generalization of the foregoing system of equations (e.g., $P_{det,\,min}$ (dBm)=K−20 $\log_{10} r_{det,min}$ and $P_{det,r}$ (dBm)=K−20 $\log_{10}(r_{det,min}+\Delta r)$), it should be noted that (a) the two differential detector power measurements, e.g., $P_1$ and $P_2$, may be performed at two different autonomous DFS master devices (e.g., autonomous DFS master device 500), so long as the corresponding differences in the detector parameters ($K_1$ and $K_2$) and range parameters ($r_1$ and $r_2$) are known; and (b) more than two differential detector power measurements, e.g., from multiple autonomous DFS master devices (e.g., autonomous DFS master device 500) within range of the common radar device 702, can be communicated to a central entity to be combined or fused via various means. One such method would be a least-squares or maximum likelihood estimation of the common radar parameters embedded in the $\{K_j\}$ for the $j^{th}$ autonomous DFS master device.

In accordance with the foregoing analysis, autonomous DFS master device 500 in collaboration with guardian component 502, processor 504, memory 506, and/or memory 508 determines a sensitivity parameter that represents a value for a received signal strength indicator (RSSI). In this instance the value determined by guardian component 502 can relate to $RSSI_{rx,\,min}$, the minimum RSSI value of the autonomous DFS master device's beacons that must be seen by a client device (e.g., client device 602) at the client's receive antenna(s)) in order for it to be considered to validly fall within the coverage umbrella of the autonomous DFS master device 500. In order to accomplish the foregoing, guardian component 502 can select, for example, a beacon transmit power and a modulation coding scheme (MCS) (among other possible parameters) to inherently limit the range of those client devices which can validly lie within the coverage umbrella provided by the autonomous DFS master device 500.

With reference briefly to FIG. 7, client devices (e.g., client device 602) within the umbrella coverage of the autonomous DFS master device 500 must be sufficiently close to the autonomous DFS master device 500 to avoid the undesirable possibility that the autonomous DFS master device 500 declares that DFS operation is permissible to those clients within the umbrella which are in fact closer to radar device 702 than $r_{det,min}$ (the distance from the radar device 702 at which the autonomous DFS master device 500 detects transmissions by radar device 702 at the DFS compliance detection threshold (e.g., −62 dBm)). As depicted in FIG. 7, it will be observed that if the umbrella coverage provided by the autonomous DFS master device 500 is limited to clients within $r_{tx,\,max}$ of the autonomous DFS master device 500, this undesirable scenario can be prevented. In practice, the radius can be further limited to reduce the distance to a defined distance $r_{tx,\,marg}$ which is less than $r_{tx,\,max}$ for a margin. Thus, given the autonomous DFS master device's 502 transmit parameters and the radar device's 702 operating parameters, guardian device 504 can determine the minimum RSSI observed by valid clients (e.g., client device 602) operating within the umbrella coverage of the autonomous DFS master device 500 as a function of their receive parameters in accordance with the following process.

Guardian component 502 can set the following autonomous DFS master device (autonomous DFS master device 500) to client device (client device 602) operating parameters: $f_c$ the client device frequency of operation in Hz; and $\Delta L_{tx}$ known path loss from autonomous DFS master device 500 to the client devices due to shadowing. $\Delta L_{tx}$ can be important in determining a minimum RSSI seen by client devices within the umbra cast by the autonomous DFS master device 500.

Guardian component 502 can then set the following radar system (e.g., radar device 702) parameters: $f_R$ a value representing a radar device's frequency of operation in Hz; $P_{det, min}$ a value representative of a radar detection compliance threshold (in dBm), for example, −62 dBm.; $P_{det}$ a value representative of a power level at which the radar device (e.g., radar device 702) is detected at the autonomous DFS master device 500 (in the case where the power level $p_{det}$ exceeds that required by the compliance threshold, the difference determines the maximum potential radius of the umbrella coverage afforded by the autonomous DFS master device 500); $r_{det,min}$ a value that represents a distance from the autonomous DFS master device 500 to the radar device (e.g., radar device 702) at the compliance threshold (in meters (m))—this distance can be known a priori (e.g., from a geographic database or other geographic location information) or can be inferred/estimated based on analysis carried out by guardian component 502. The distance to the radar device 702 from the autonomous DFS master device 500 can be important in setting the maximum radius (r) of the umbrella coverage provided by the autonomous DFS master device 500. Additional parameters that can also be set by guardian component 502 include: $\Delta P_{tx, marg}$ a value representative of any additional desired RSSI margin—corresponding to $r_{tx, marg}$ within the umbrella coverage afforded by the autonomous DFS master device 500. $\Delta P_{t, marg}$ is measured in decibels (dB).

Guardian component 502 can then set client input parameters, such as: a channel spacing/width—for IEEE 802.11-2012 high throughput (HT) mode the channel spacing (in megahertz (MHz)) is one of 20, 10, or 5; for IEEE 802.11ac-2013 very high throughput (VHT) mode the channel width is from one of 20 or 40 (in MHz); $P_{tx}$ a value that represents the power output supplied from antennas associated with autonomous DFS master device 500 (in dBm); $G_{rx,ant}$ a value representative of a client device's receive antenna gain (in dBi); $G_{rx,afe}$ a value representing a client device's analog front end (AFE) gain (in dB)—this gain typically includes the net effect of all attenuators, drivers, and low noise amplifier (LNA) gains in the receiver (rx) signal path known at the client device; and $G_{rx, proc}$ a value that represents a client device's receive processing gain (in dB), where if maximum ratio combining (MRC) is used with two antenna at the receiver, this gain would be 3 dB, for instance.

As a function of the autonomous DFS master device 500 to client device 602 operating parameters; the radar system (e.g., radar device 702) parameters; and the client device (client device 602) input parameters set forth above, guardian component 502 determines a desired RSSI value for client devices validly within the coverage umbrella of the autonomous DFS master device 500, as well as other related information output. The output supplied by guardian component 502 can include: $RSSI_{rx, min}$—a value that represents a minimum RSSI value required at the client device receive antenna for valid beacon reception (in dBm)—this value is generally computed/determined as the minimum received sensitivity specified by the IEEE 802.11 n/ac standards for a particular modulation coding scheme (MCS) less all known client receive gains from an associated antenna, AFE, and signal processing (as these factors increase the effective sensitivity of the client device at an associated antenna); $d_{max}$—a value that represents a maximum distance measured from a client device to the autonomous DFS master device 500 (in meters) determined as a function of the maximum path loss computed from the perspective of the autonomous DFS master device 500 and the minimum RSSI value expected at the client device receive antenna. All other things being equal, this maximum distance ($d_{max}$) decreases with increasing MCS due to the higher signal-to-noise requirement as the modulation order increases.

The output supplied by guardian component 502 can also include: $d_{min}$—a value similar to the maximum distance ($d_{max}$) except that $d_{min}$ is a value representative of a minimum distance measured from the client device to the autonomous DFS master device 500 (in meters). Determination of values for $d_{min}$ uses the same calculation as in the maximum distance case except for the inclusion of a known additional path loss $\Delta L_{tx}$ from the autonomous DFS master device 500 to a client device (e.g., client device 602). As in the maximum distance ($d_{max}$) case, this distance, $d_{min}$, decreases with increasing modulation order.

Further output generated by guardian component 502 can also include: respective values for $RSSI_{rx, umbr}$ and $RSSI_{rx, marg}$. $RSSI_{rx, umbr}$ represents a minimum RSSI value (in dB) expected at a client device receive antenna for those client devices that lie validly within the transmission/broadcast ambit of the autonomous DFS master device 500. The $RSSI_{rx, umbr}$ value can be determined as a function of beacon transmit power less any path losses (from propagation, shadowing, etc.). It should be noted, in accordance with standards promulgated in IEEE 802.11-2012 and IEEE 802.11ac-2013, the corresponding RSSI values reported for beacons should take into account known client device receive gains from their associated antenna(s), AFE, and signal processing to reference the measurement to the client device receive antenna. The value for $RSSI_{rx, marg}$ represents a difference between the value represented by $RSSI_{rx, min}$ and the value represent by $RSSI_{rx, umbr}$. When the margin value is positive for a particular MCS and transmit power, the autonomous DFS master device 500 can use the MCS and/or transmit power to signal to client devices within its association range that they can join the autonomous DFS master device's 502 umbrella coverage, since any client capable of decoding under a defined MCS and/or transmit power must be sufficiently close to the autonomous DFS master device 500 for the umbrella coverage to be valid. Conversely, when the margin value is zero or negative for a defined MCS and transmit power, this means that there can be client devices which can decode the transmission beacon under those conditions, but are beyond the valid range of the autonomous DFS master device 500 umbrella coverage.

It should be noted in the context of instances where there are no discernible or detectable radar transmissions detected by the autonomous DFS master device 500 and emanating from radar transmitting devices, that autonomous DFS master device 500 can determine that client devices fall within the scope of the coverage umbrella cast by the autonomous DFS master device 500 when the value of the received signal strength indication (RSSI) returned by a client device to the autonomous DFS master device 500 is greater than the value of $RSSI_{rx, umbr}$—the minimum RSSI value (in dB) expected at a client device receive antenna for those client devices that lie validly within the transmission/broadcast ambit of the autonomous DFS master device 500.

Additional diagnostic and/or informational output that can be generated and supplied by guardian component 502 can also include diagnostic and information output, such as: $\Delta P_{det,min}$—a value representing a difference between the radar detection compliance threshold and a power level at which the radar device is detected at the autonomous DFS master device 500 (in dB); $\delta_{det,min}$—a value that represents a fraction of extra detection distance over the compliance minimum detection distance; this value can be determined by guardian component 502 utilizing:

$$P_{det,min} \text{ (dBm)} - \Delta P_{det,min} \text{ (dB)} = K - 20 \log_{10}(r_{det,min} \cdot (1 + \delta_{det,min})) \Rightarrow \Delta P_{det,min} \text{ (dB)} = 20 \log_{10}(1 + \delta_{det,min}).$$

Further diagnostic and/or informational output determined by guardian component 502 can also include: $r_{tx, max}$—a value that represents a maximum radius in meters of the autonomous DFS master device's 502 umbrella coverage. $r_{tx,\ max}$ can be determined by guardian component 502 from: $r_{tx,max}=r_{det,min}\cdot\delta_{det,min}$. Guardian component 502 can also generate and output values for $L_{tx,max}$ and $P_{sens,min}\cdot L_{tx,max}$ can be a value (in dB) that represents a path loss (due to ideal isotropic propagation) to a client device at the autonomous DFS master device's 502 maximum umbrella coverage radius. The value representing $L_{tx,max}$ can be used to determine the minimum RSSI value expected for client devices within the autonomous DFS master device's 502 coverage umbrella. $P_{sens,min}$ can be a value that represents a minimum sensitivity value (in dBm) for a given autonomous DFS master device's 502 transmit MCS and channel spacing/width as set forth in tables associated with IEEE 802.11-2012 (for HT mode) and IEEE 802.11ac-2013 (for VHT mode).

Figure 8:
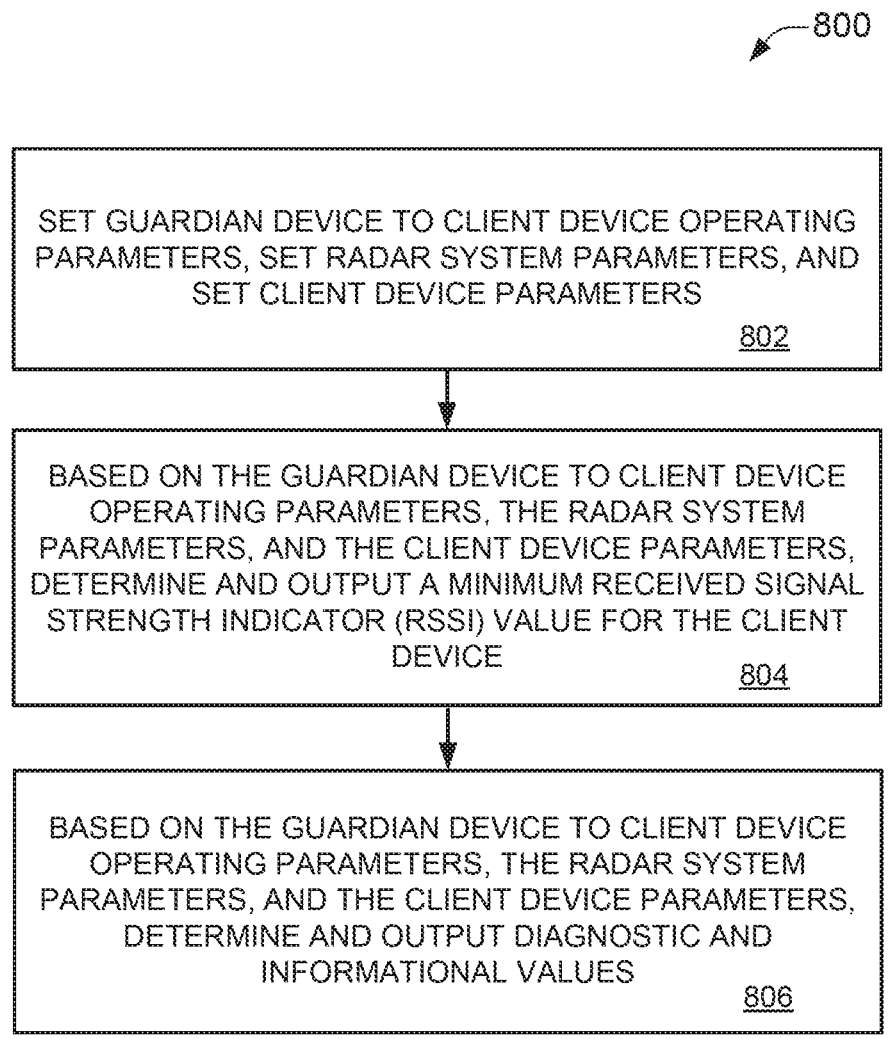
FIG. 8 illustrates a method of the provision of over the air signaling of dynamic frequency selection operating parameters to client devices, according to the subject application.

FIG. 8 illustrates an exemplary method 800 according to the present invention for providing over the air signaling of dynamic frequency selection operating parameters to client devices, in accordance with an embodiment. Method 800 can be performed by autonomous DFS master device 500, and more specifically by guardian component 502 in conjunction with processor 504, memory 506, and/or storage 508. Initially, at 802, the autonomous DFS master device 500 can set parameters related to autonomous DFS master device 500 (the guardian device) to client device operating parameters, these can include parameters relating to $f_c$ the client device frequency of operation; and $\Delta L_{tx}$ known path loss from autonomous DFS master device 500 to the client devices due to shadowing.

Additionally, at 802, the autonomous DFS master device 500 can set parameters related to radar system parameters, such as: $f_R$ a value representing a radar device's frequency of operation; $P_{det,\ min}$ a value representative of a radar detection compliance threshold; $P_{det}$ a value representative of a power level at which the radar device (e.g., radar device 702) is detected at the autonomous DFS master device 500; $r_{det,min}$ a value that represents a distance from the autonomous DFS master device 500 to the radar device (e.g., radar device 702) at the compliance threshold; and $\Delta P_{tx,\ marg}$ a value representative of any additional desired RSSI margin—corresponding to $r_{tx,\ marg}$—within the umbrella coverage afforded by the autonomous DFS master device 500.

Also at 802 the autonomous DFS master device can set client input parameters, such as: a channel spacing/width, wherein for IEEE 802.11-2012 HT mode the channel spacing is one of 20, 10, or 5, and for IEEE 802.11ac-2013 VHT mode the channel width is from one of 20 or 40; $P_{tx}$ a value that represents the power output supplied from antennas associated with autonomous DFS master device 500; $G_{rx,ant}$ a value representative of a client device's receive antenna gain; $G_{rx,afe}$ a value representing a client device's AFE gain; and $G_{rx,\ proc}$ a value that represents a client device's receive processing gain.

At 804, based on the foregoing parameters (e.g., autonomous DFS master device to client device operating parameters, the radar system parameters, and the client device parameters set at 802), autonomous DFS master device 502 can determine and output a sensitivity value that can represent a minimum received signal strength indicator (RSSI) value (e.g., $RSSI_{rx,\ min}$).

At 806, based on, or as a function of the autonomous DFS master device to client device operating parameters, the radar system parameters, and the client device parameters set at 802, the autonomous DFS master device 502 can also determine and output diagnostic and information data that can include: $d_{max}$—a value that represents a maximum distance measured from a client device to the autonomous DFS master device 500 determined as a function of the maximum path loss computed from the perspective of the autonomous DFS master device 500 and the minimum RSSI value expected at the client device receive antenna, $d_{min}$—a value similar to the maximum distance ($d_{max}$) except that $d_{min}$ is a value representative of a minimum distance measured from the client device to the autonomous DFS master device 500, respective values for $RSSI_{rx,\ umbr}$ and $RSSI_{rx,\ marg}$, $\Delta P_{det,min}$ a value representing a difference between the radar detection compliance threshold and a power level at which the radar device is detected at the autonomous DFS master device 500 (in dB); $\delta_{det,min}$—a value that represents a fraction of extra detection distance over the compliance minimum detection distance, $r_{tx,\ max}$—a value that represents a maximum radius in meters of the autonomous DFS master device's 502 umbrella coverage, and values for $L_{tx,max}$ and $P_{sens,min}$, wherein $L_{tx,max}$ is a value representative of a path loss to a client device at the autonomous DFS master device's 502 maximum umbrella coverage radius, and $P_{sens,min}$ is representative of a minimum sensitivity value for a given autonomous DFS master device's 502 transmit MCS and channel spacing/width.

In the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and does not necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
   a memory that stores executable instructions that, when executed by a processor, facilitates performance of operations, comprising:

generating an instruction for a radio device to transmit dynamic frequency selection parameters to a client device, wherein the instruction is determined based on a maximum range value of a radar detection umbrella associated with a multichannel master device, a compliance range value, or a margin range value;

determining the maximum range value as a function of a first range at which the multichannel master device detects a first radar transmission transmitted by a radar device at a defined transmission power value;

determining the compliance range value as a function of a second range at which the multichannel master device detects a second radar transmission transmitted by the radar device at a dynamic frequency selection compliance threshold transmission power value; and determining the margin range value as a function of a third range at which the multichannel master device detects a third radar transmission transmitted by the radar device at a transmission power value that is lower than the dynamic frequency selection compliance threshold transmission power value.

2. The device of claim 1, wherein the maximum range value is determined as a function of at least two radar received power measurement values transmitted at different ranges from the radar device.

3. The device of claim 1, wherein the compliance range value is determined as a function of at least two radar received power management values transmitted at different ranges from the radar device.

4. The device of claim 1, wherein the margin range value is determined as a function of at least two radar received power measurement values transmitted at different ranges from the radar device.

5. The device of claim 1, wherein the radar device is a first radar device, and wherein the maximum range value is determined as a function of a radar received power measurement value transmitted from different ranges from the first radar device and a second radar device.

6. The device of claim 1, wherein the radar device is a first radar device, and wherein the compliance range value is determined as a function of a radar received power measurement value transmitted from different ranges from the first radar device and a second radar device.

7. The device of claim 1, wherein the radar device is a first radar device, and wherein the margin range value is determined as a function of a radar received power measurement value transmitted from different ranges from the first radar device and a second radar device.

8. The device of claim 1, wherein the radar device is a first radar device, and wherein the maximum range value is determined as a function of a radar received power measurement value representing ranges associated with the first radar device or a second radar device.

9. The device of claim 1, wherein the radar device is a first radar device, and wherein the compliance range value is determined as a function of a radar received power measurement value representing ranges associated with the first radar device or a second radar device.

10. The device of claim 1, wherein the radar device is a first radar device, and wherein the margin range value is determined as a function of a radar received power measurement value representing ranges associated with the first radar device or a second radar device.

11. The device of claim 1, wherein the operations further comprise determining an actual range value of the radar detection umbrella as a function of a reduction of the maximum range value by a defined margin value.

12. A method, comprising:
generating, by a device comprising a processor, an instruction for a radio device to transmit dynamic frequency selection parameters to a client device, wherein the instruction is determined based on a maximum range value of a radar detection umbrella associated with a multichannel master device, a compliance range value, or a margin range value;

determining, by the device, the maximum range value as a function of a first range at which the multichannel master device detects a first radar transmission transmitted by a radar device at a defined transmission power value;

determining, by the device, the compliance range value as a function of a second range at which the multichannel master device detects a second radar transmission transmitted by the radar device at a dynamic frequency selection compliance threshold transmission power value; and determining, by the device, the margin range value as a function of a third range at which the multichannel master device detects a third radar transmission transmitted by the radar device at a transmission power value that is lower than the dynamic frequency selection compliance threshold transmission power value.

13. The method of claim 12, further comprising determining, by the device, the maximum range value as a function of a radar received power measurement value transmitted at different ranges from the radar device.

14. The method of claim 12, further comprising determining, by the device, the compliance range value as a function of a radar received power measurement value[s] transmitted at different ranges from the radar device.

15. The method of claim 12, further comprising determining, by the device, the margin range value as a function of a radar received power measurement value[s] transmitted at different ranges from the radar device.

16. The method of claim 12, wherein the radar device is a first radar device, further comprising determining, by the device, the maximum range value as a function of a radar received power measurement value[s] transmitted from different ranges from the first radar device and a second radar device.

17. The method of claim 12, wherein the radar device is a first radar device, further comprising determining, by the device, the compliance range value as a function of a radar received power measurement value[s] transmitted from different ranges from the first radar device and a second radar device.

18. The method of claim 12, wherein the radar device is a first radar device, further comprising determining, by the device, the margin range value as a function of a radar received power measurement value transmitted from different ranges from the first radar device and a second radar device.

19. A machine-readable non-transitory storage medium, comprising executable instructions that, when executed by a processor, facilitate performance of operations, comprising:
in response to determining a maximum range value of a radar detection umbrella associated with a multichannel master device, generating an instruction for a radio device to transmit dynamic frequency selection parameters to a client device;

wherein the maximum range value is determined as a function of a first range at which the multichannel master device detects a first radar transmission transmitted by a radar device at a defined transmission power value;

wherein the compliance range value is determined as a function of a second range at which the multichannel master device detects a second radar transmission transmitted by the radar device at a dynamic frequency selection compliance threshold transmission power value; and wherein the margin range value is determined as a function of a third range at which the multichannel master device detects a third radar transmission transmitted by the radar device at a transmission power value that is lower than the dynamic frequency selection compliance threshold transmission power value.

20. The machine-readable storage medium of claim 19, further comprising determining a beacon power transmit power to be used by client devices to ensure dynamic frequency selection compliance based on an azimuth value associated with the client devices determined from a perspective of the multichannel master device.

\* \* \* \* \*